United States Patent
Ciochina et al.

(10) Patent No.: US 8,995,374 B2
(45) Date of Patent: Mar. 31, 2015

(54) METHOD FOR DETERMINING INFORMATION WHICH ENABLE A MOBILE STATION TO IDENTIFY WHICH RESOURCES ARE ALLOCATED TO THE MOBILE STATION

(75) Inventors: Cristina Ciochina, Rennes (FR); Loic Brunel, Rennes (FR); Masatsugu Higashinaka, Kanagawa (JP)

(73) Assignee: Mitsubishi Electric Corporation, Tokyo (JP)

(*) Notice: Subject to any disclaimer, the term of this patent is extended or adjusted under 35 U.S.C. 154(b) by 69 days.

(21) Appl. No.: 13/640,801

(22) PCT Filed: Apr. 4, 2011

(86) PCT No.: PCT/EP2011/055216
§ 371 (c)(1),
(2), (4) Date: Nov. 14, 2012

(87) PCT Pub. No.: WO2011/128221
PCT Pub. Date: Oct. 20, 2011

(65) Prior Publication Data
US 2013/0051345 A1   Feb. 28, 2013

(30) Foreign Application Priority Data
Apr. 14, 2010  (EP) .................................. 10159865

(51) Int. Cl.
*H04W 4/00* (2009.01)
*H04L 5/00* (2006.01)
*H04W 72/04* (2009.01)

(52) U.S. Cl.
CPC ............ *H04L 5/0091* (2013.01); *H04L 5/0041* (2013.01); *H04L 5/0007* (2013.01); *H04W 72/04* (2013.01)
USPC ........................................ 370/329

(58) Field of Classification Search
CPC ............................ H04L 5/0041; H04L 5/0039
See application file for complete search history.

(56) References Cited

U.S. PATENT DOCUMENTS

| 2009/0175231 A1* | 7/2009 | Seo et al. ...................... 370/329 |
| 2009/0316814 A1* | 12/2009 | Seo et al. ...................... 375/260 |
| 2011/0122830 A1 | 5/2011 | Dai et al. |

FOREIGN PATENT DOCUMENTS

| EP | 2 136 503 | 12/2009 |
| WO | 2009 043208 | 4/2009 |

OTHER PUBLICATIONS

TSG RAN WG1 meeting 45 R1-061246, "Unified uplink CQI signaling by efficient labeling," Huawei, Total 7 Pages, (May 8 to 12, 2006) XP-50102126.

(Continued)

*Primary Examiner* — Huy D Vu
*Assistant Examiner* — Kevin Cunningham
(74) *Attorney, Agent, or Firm* — Oblon, McClelland, Maier & Neustadt, L.L.P.

(57) ABSTRACT

A method determining information enabling a mobile station to identify which wireless telecommunication network resources are allocated to the mobile station. The allocated resources are divided into plural non contiguous clusters of resources. The method includes: allocating resources to the mobile station; determining, from the allocated resources, plural ordered parameters each equal to a number of contiguous resources allocated or not to the mobile station; calculating, for a first parameter, a number of possibilities having a subset of resources including an amount of resources that is lower than the first parameter; calculating, for each following parameter, a number of possibilities having subsets of resources including amounts of resources respectively equal to the respective parameters having a lower rank than the following parameter and having a subset of at least one resource including an amount of resources lower than the following parameter; determining information by summing the calculated numbers.

14 Claims, 11 Drawing Sheets

(56) References Cited

OTHER PUBLICATIONS

3GPP TS 36.213 V9.1.0, "3$^{rd}$ Generation Partnership Project; Technical Specification Group Radio Access Network; Evolved Universal Terrestrial Radio Access (E-UTRA); Physical layer procedure (Release 9)," LTE, pp. 1 to 79, (Mar. 2010) XP-2587854.

3GPP TSG RAN WG1 Meeting #58bis R1-093881, "Non-contiguous uplink resource allocation for LTE-A," ASUSTeK, Total 4 Pages, (Oct. 12 to 16, 2009) XP-50388385.

3GPP TSG RAN WG1 Meeting #58bis R1-093803, "Uplink Non-contiguous Resource Allocation for LTE-Advanced," ZTE, Total 6 Pages, (Oct. 12 to 16, 2009) XP-50388317.

Knuth, D., "Generating all Combinations," The Art of Computer Programing, vol. 3., Total 65 Pages, (Mar. 31, 2005) XP-7918843.

International Search Report Issued Jul. 7, 2011 in PCT/EP11/055216 Filed Apr. 4, 2011.

* cited by examiner

METHOD FOR DETERMINING INFORMATION WHICH ENABLE A MOBILE STATION TO IDENTIFY WHICH RESOURCES ARE ALLOCATED TO THE MOBILE STATION

The present invention relates generally to a method and a device for determining information which enable a mobile station to identify which resources of a wireless telecommunication network are allocated to the mobile station.

More precisely, the present invention is in the field of the signalling of resources allocated to a mobile station in a wireless telecommunication network.

Orthogonal Frequency-Division Multiplexing (OFDM) is based upon the principle of frequency-division multiplexing (FDM) and is implemented as a digital modulation scheme. The bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross talk between the sub-channels is eliminated.

The primary advantage of OFDM is its ability to cope with severe channel conditions, for example, multipath and narrowband interference, without complex equalization filters. Channel equalization is simplified by using many slowly modulated narrowband signals instead of one rapidly modulated wideband signal.

A variation called DFT spread OFDM or SC-FDMA (Single Carrier Frequency-Division Multiple Access) has been developed. In this system, each symbol to be transmitted is spread over a set of transmitted frequencies by a DFT (Discrete Fourier Transform), the resulting signal is sent over a conventional OFDMA transmission system.

Actual implementation of coding/decoding is made either in the frequency domain or in the time domain while the implementation in the frequency domain may be preferred.

Sometimes, the used subcarriers cannot be allocated in a contiguous sub-band, but need to be separated into several clusters. This leads to Clustered SC-FDMA, which has the advantage of a more flexible subcarrier mapping with respect to localized SC-FDMA, leading to more scheduling gain and better multi-user multiplexing.

The present invention aims at providing a telecommunication system wherein all the sub-carriers allocated to a telecommunication device are divided into at least two non contiguous clusters and wherein the signalling of the allocated sub-carriers is reduced.

To that end, the present invention concerns a method for determining information which enable a mobile station to identify among a set of resources that can be allocated in a wireless telecommunication network to the mobile station, which resources of the wireless telecommunication network are allocated to the mobile station, the allocated resources being divided into plural non contiguous clusters of one resource or of plural contiguous resources, characterised in that the method comprises the steps of:

allocating resources to the mobile station, the allocated resources dividing the set of resources into subsets of resources, determining, from the allocated resources, plural ordered parameters, each parameter being equal to a number of contiguous resources in a subset of at least one resource corresponding to the parameter, the at least one resource being not allocated to the mobile station or forming a cluster of one resource or of plural contiguous resources allocated to the mobile station, calculating, for the first parameter, within the set of possible resource allocations, the number of possibilities of having in the corresponding subset, an amount of resources that is lower than the first parameter, calculating, for each following parameter, within the set of possible resource allocations, the number of possibilities of having for each subset corresponding to a parameter having a lower rank than said following parameter an amount of resources that is equal to the parameter the subset corresponds to and having in the subset corresponding to said following parameter an amount of resources that is lower than said following parameter, determining information which enable a mobile station to identify which resources of the wireless telecommunication network are allocated to the mobile station by summing all the calculated numbers.

The present invention concerns also a device for determining information which enable a mobile station to identify among a set of resources that can be allocated in a wireless telecommunication network to the mobile station, which resources of the wireless telecommunication network are allocated to the mobile station, the allocated resources being divided into plural non contiguous clusters of one resource or of plural contiguous resources, characterised in that the device for determining information comprises:

means for allocating resources to the mobile station, the allocated resources dividing the set of resources into subsets of resources, means for determining, from the allocated resources, plural ordered parameters, each parameter being equal to a number of contiguous resources in a subset of at least one resource corresponding to the parameter, the at least one resource being not allocated to the mobile station or forming a cluster of one resource or of plural contiguous resources allocated to the mobile station, means for calculating, for the first parameter, within the set of possible resource allocations, the number of possibilities of having in the corresponding subset, an amount of resources that is lower than the first parameter, means for calculating, for each following parameter, within the set of possible resource allocations, the number of possibilities of having for each subset corresponding to a parameter having a lower rank than said following parameter an amount of resources that is equal to the parameter the subset corresponds to and having in the subset corresponding to said following parameter an amount of resources that is lower than said following parameter, means for determining information which enable a mobile station to identify which resources of the wireless telecommunication network are allocated to the mobile station by summing all the calculated numbers.

Thus, it is possible to allocate non contiguous resources of the wireless telecommunication network to a mobile station with a reduced signalling of the allocated resources.

According to a particular feature, at least two non-contiguous clusters of one resource or of plural contiguous resources are allocated to the mobile station, each cluster of one resource or of plural contiguous resources comprising a number of resources which is independent of the number of resources comprised in other allocated cluster or clusters of one resource or of plural contiguous resources, and the number of resources separating two clusters of one resource or of plural contiguous resources is independent of any other resources that may either separate two clusters of one resource or of plural contiguous resources, or be comprised in other allocated clusters of one resource or of plural contiguous resources.

Thus, a maximum of flexibility is ensured.

According to a particular feature, at least three non-contiguous clusters of one resource or of plural contiguous resources are allocated to the mobile station, each cluster of one resource or of plural contiguous resources comprising the same number of resources which is independent of any other resources that may separate two clusters.

Thus, signaling overhead is reduced.

According to a particular feature, the first parameter is the number of resources comprised in each cluster of one resource or of plural contiguous resources.

According to a particular feature, at least three non-contiguous clusters of one resource or of plural contiguous resources are allocated to the mobile station, each cluster of one resource or of plural contiguous resources comprising a number of resources which is independent of the number of resources comprised in other allocated clusters of one resource or of plural contiguous resources and the numbers of resources separating two clusters are identical.

Thus, signaling overhead is reduced.

According to a particular feature, the first parameter is the number of resources separating two clusters of one resource or of plural contiguous resources.

Thus, the complexity to implement the present invention is reduced.

According to a particular feature, the number of clusters of one resource or of plural contiguous resource is predetermined.

Thus, the signalling overhead is reduced.

According to a particular feature, the base station:
computes the number of all possible resource allocations with at least a predetermined number of clusters and less than the current number of clusters,
modifies the information which enables the mobile station to identify which resources of the wireless telecommunication network are allocated to the mobile station by adding the number of all possible resource allocations with at least a predetermined number of clusters and less than the current number of clusters to the information.

Thus, the mobile station is able to determine the number of clusters that were allocated to it without prior knowledge on this number of clusters.

According to still another aspect, the present invention concerns a method for identifying among a set of resources that can be allocated in a wireless telecommunication network to a mobile station, which resources of the wireless telecommunication network are allocated to the mobile station, the allocated resources being divided into plural non contiguous clusters of one resource or of plural contiguous resources, characterised in that the method comprises the steps executed by the mobile station of:
receiving information which enable the mobile station to identify which resources of the wireless telecommunication network are allocated to the mobile station,
determining a number of possibilities of having a subset of at least one resource corresponding to a first parameter, the subset comprising less than a first amount of resources,
determining a number of possibilities of having a subset of at least one resource corresponding to the first parameter, the subset comprising less than the first amount of resources plus one,
selecting the first amount of resources as a first parameter if the number of possibilities of having a subset of at least one resource corresponding to the first parameter, the subset comprising less than the first amount of resources, is lower than or equal to the received information and if the number of possibilities of having a subset corresponding to the first parameter, the subset of at least one resource comprising less than the first amount of resources plus one, is upper than the received information,
modifying the information which enables the mobile station to identify which resources of the wireless telecommunication network are allocated to the mobile station by subtracting the number of possibilities of having a subset of at least one resource corresponding to the first parameter, the subset comprising an amount of resources inferior to the first parameter, from the information which enables the mobile station to identify which resources of the wireless telecommunication network are allocated to the mobile station,
and as far as all the parameters are not determined,
determining for the following parameter, within the set of possible resource allocations:
a first number of possibilities of having for each subset of at least one resource corresponding to a parameter having a lower rank than said following parameter, each subset comprising an amount of resources that is equal to the parameter the subset corresponds to and having a subset of at least one resource corresponding to said following parameter comprising an amount of resources that is lower than a given value,
a second number of possibilities of having for each subset of at least one resource corresponding to a parameter having a lower rank than said following parameter, each subset comprising an amount of resources that is equal to the parameter the subset corresponds to and having a subset of at least one resource corresponding to said following parameter comprising an amount of resources that is lower than a given value plus one,
selecting the given value as following parameter if the first number is lower than or equal to the modified information and if the second number is upper than the modified information,
updating the modified information by subtracting the first number from the modified information,
identifying among the set of resources that can be allocated in the wireless telecommunication network to the mobile station, which resources of the wireless telecommunication network are allocated to the mobile station according to the parameters when all the parameters are determined.

The present invention concerns also a device for identifying among a set of resources that can be allocated in a wireless telecommunication network to a mobile station, which resources of the wireless telecommunication network are allocated to the mobile station, the allocated resources being divided into plural non contiguous clusters of one resource or of plural contiguous resources, characterised in that the device for identifying is included in the mobile station and comprises:
means for receiving information which enable the mobile station to identify which resources of the wireless telecommunication network are allocated to the mobile station, means for determining a number of possibilities of having a subset of at least one resource corresponding to a first parameter, the subset comprising less than a first amount of resources, means for determining a number of possibilities of having a subset of at least one resource corresponding to the first parameter, the subset comprising less than the first amount of resources plus one, means for selecting the first amount of resources as a first parameter if the number of possibilities of having a subset of at least one resource corresponding to the first parameter, the subset comprising less than the first amount of resources, is lower than or equal to the received information and if the number of possibilities of having a subset corresponding to the first parameter, the subset of at least one resource comprising less than the first amount of resources plus one, is upper than the received information, means for modifying the information which enables the mobile station to identify which resources of the wireless telecommunication network are allocated to the mobile station by subtracting the number of possibilities of having a subset of at least one resource corresponding to the first parameter, the corresponding subset comprising an amount of resources inferior to the first parameter from the information which enables the mobile station to identify which resources of the wireless telecommunication network are allocated to the mobile station, means for determining for the following parameter, within the set of possible resource allocations and as far as all the parameters are not determined:
  a first number of possibilities of having for each subset of at least one resource corresponding to a parameter having a lower rank than said following parameter, each subset comprising an amount of resources that is equal to the parameter the subset corresponds to and having a subset of at least one resource corresponding to said following parameter comprising an amount of resources that is lower than a given value,
  a second number of possibilities of having for each subset of at least one resource corresponding to a parameter having a lower rank than said following parameter, each subset comprising an amount of resources that is equal to the parameter the subset corresponds to and having a subset of at least one resource corresponding to said following parameter comprising an amount of resources that is lower than a given value plus one, means for selecting for the following parameter the given value as following parameter if the first number is lower than or equal to the modified information and if the second number is upper than the modified information, as far as all the parameters are not determined, means for updating the modified information by subtracting the first number from the modified information as far as all the parameters are not determined, means for identifying among the set of resources that can be allocated in the wireless telecommunication network to the mobile station, which resources of the wireless telecommunication network are allocated to the mobile station according to the parameters when all the parameters are determined.

Thus, it is possible to allocate non contiguous resources of the wireless telecommunication network to a mobile station with a limited signalling of the allocated resources.

According to a particular feature, the number of allocated clusters is determined by the mobile station by:
  determining the number of resource allocations with at least a minimum predetermined number of clusters and less than a given number of clusters,
  determining the number of resource allocations with at least the minimum predetermined number of clusters and less than the given number plus one of clusters,
  selecting the given number as the number of clusters if the number of resource allocations with at least the predetermined minimum number of clusters and less than the given number of clusters is lower than or equal to the received information and if the number of resource allocations with at least the minimum predetermined number of clusters and less than the given number plus one of clusters is upper than the received information,
  modifying the received information by subtracting the value of number of resource allocations with at least the predetermined minimum number of clusters and less than the given number of clusters from the received information.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the method and apparatus according to the invention, they will not be repeated here.

The characteristics of the invention will emerge more clearly from a reading of the following description of an example embodiment, the said description being produced with reference to the accompanying drawings, among which:

Figure 1:
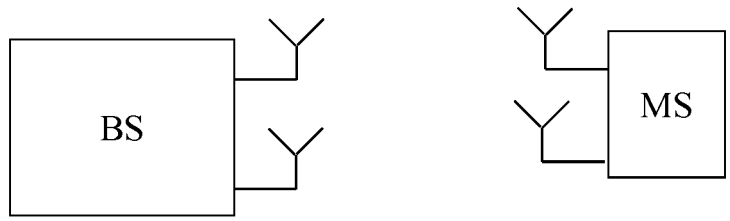
FIG. 1 represents a wireless cellular telecommunication network in which the present invention is implemented.
Figure 7:
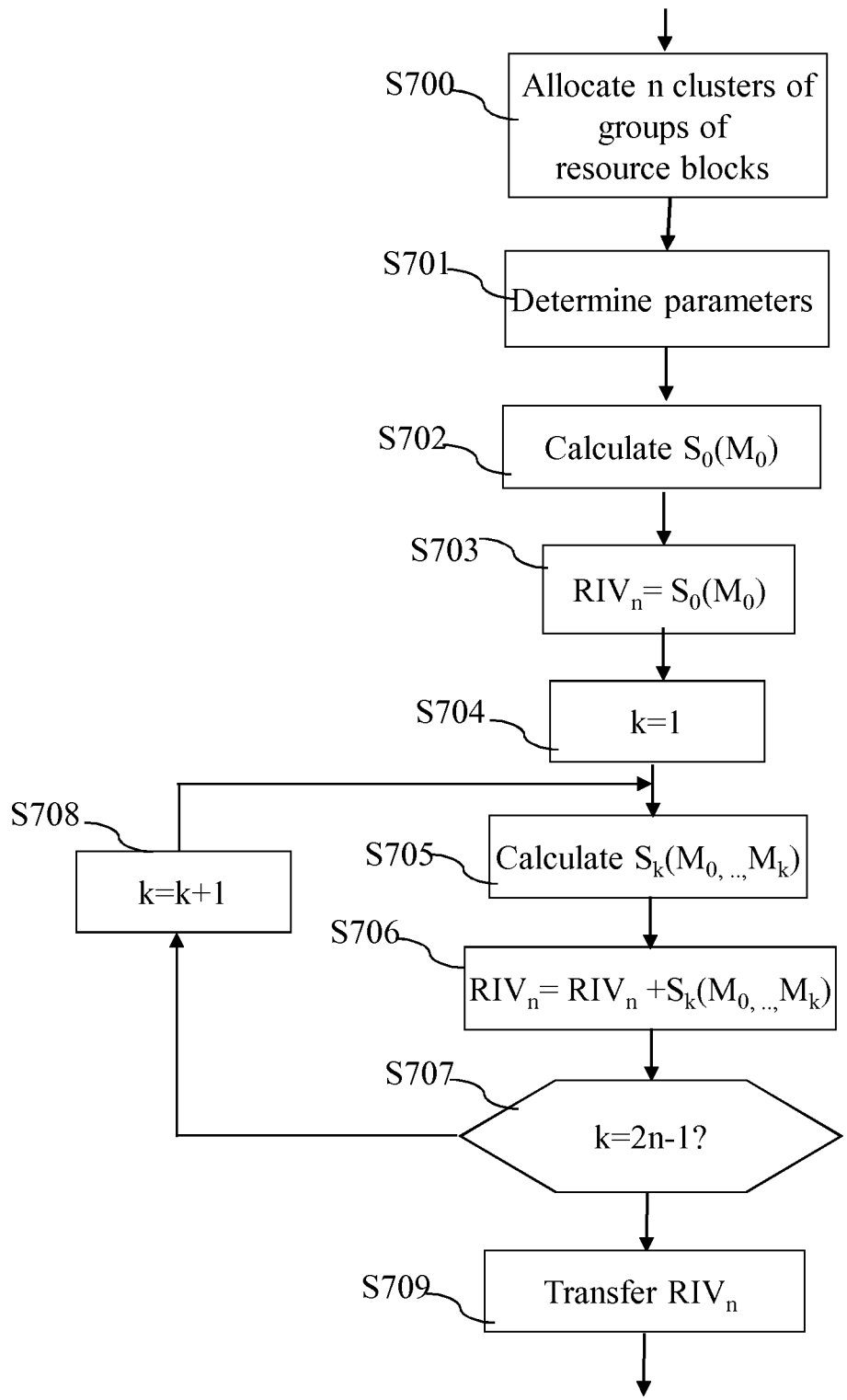
Figure 8:
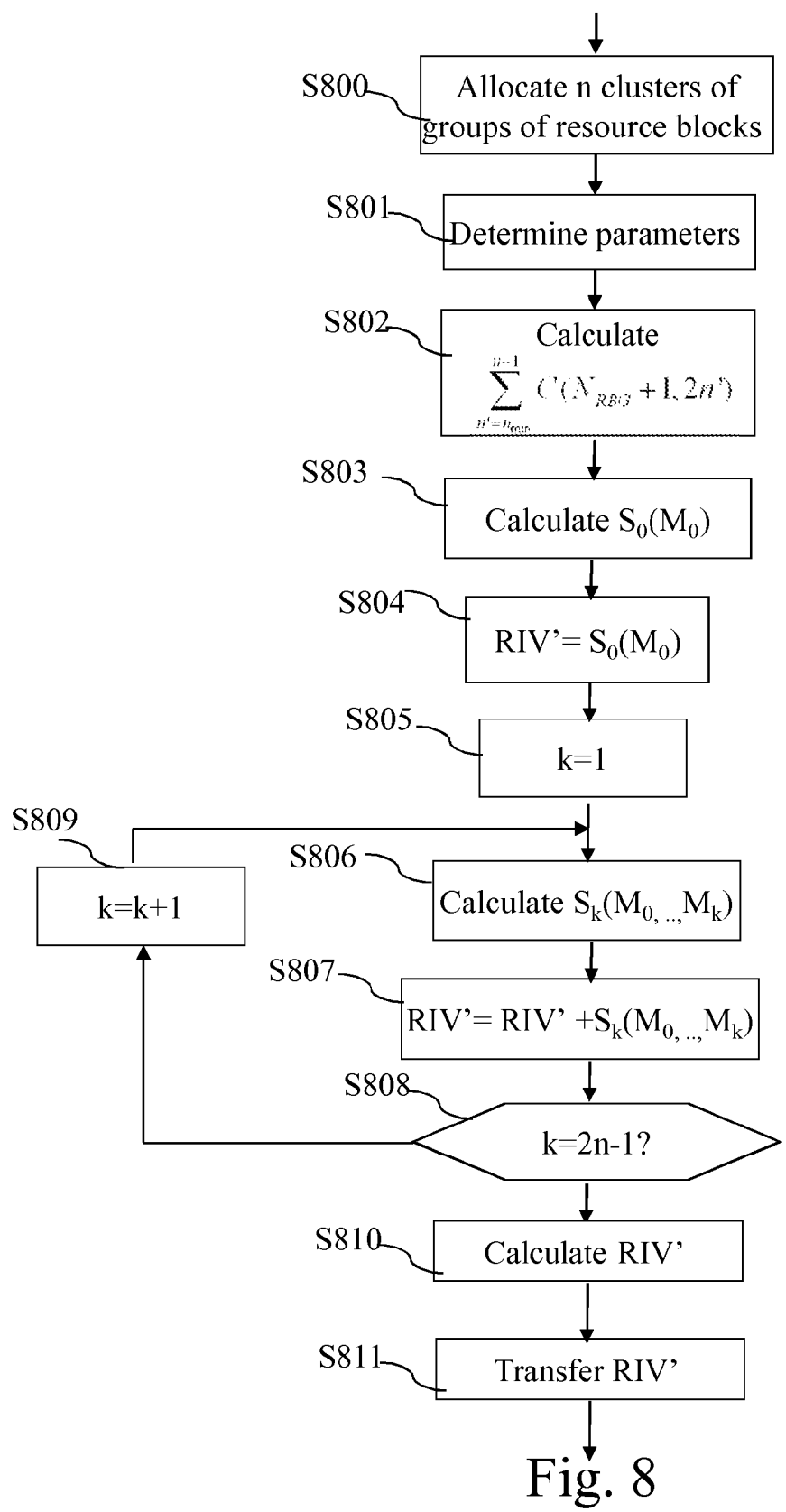
Figure 9:
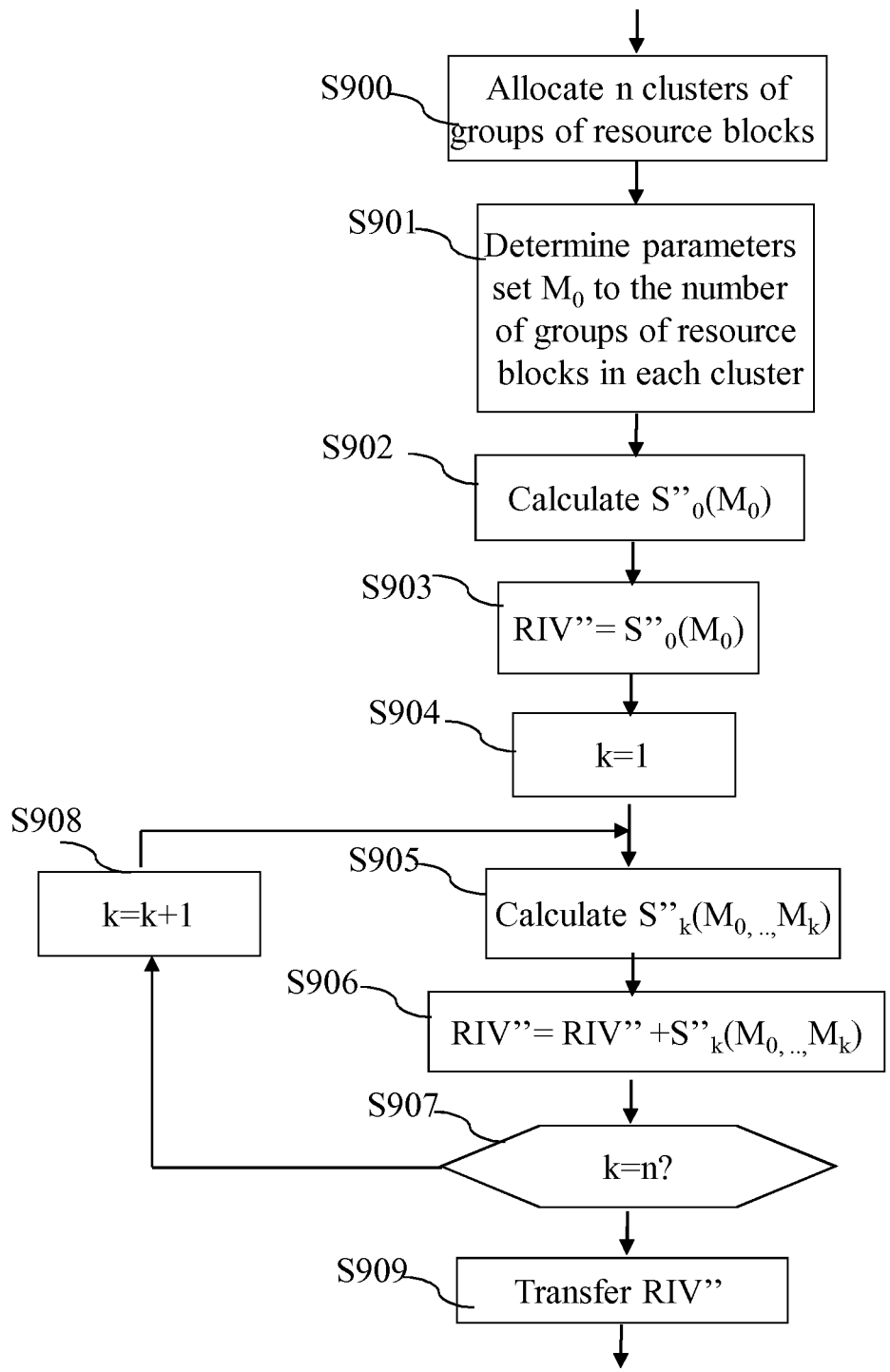
Figure 10:
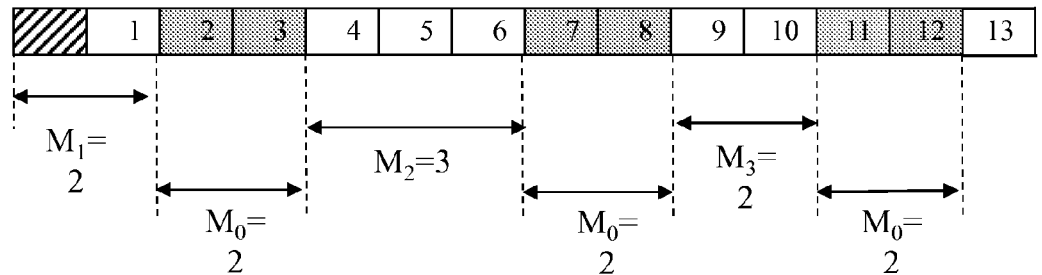
Figure 12:
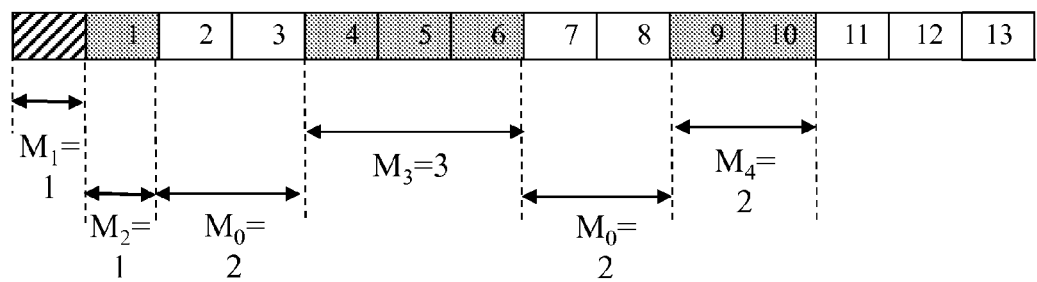
Figure 11:
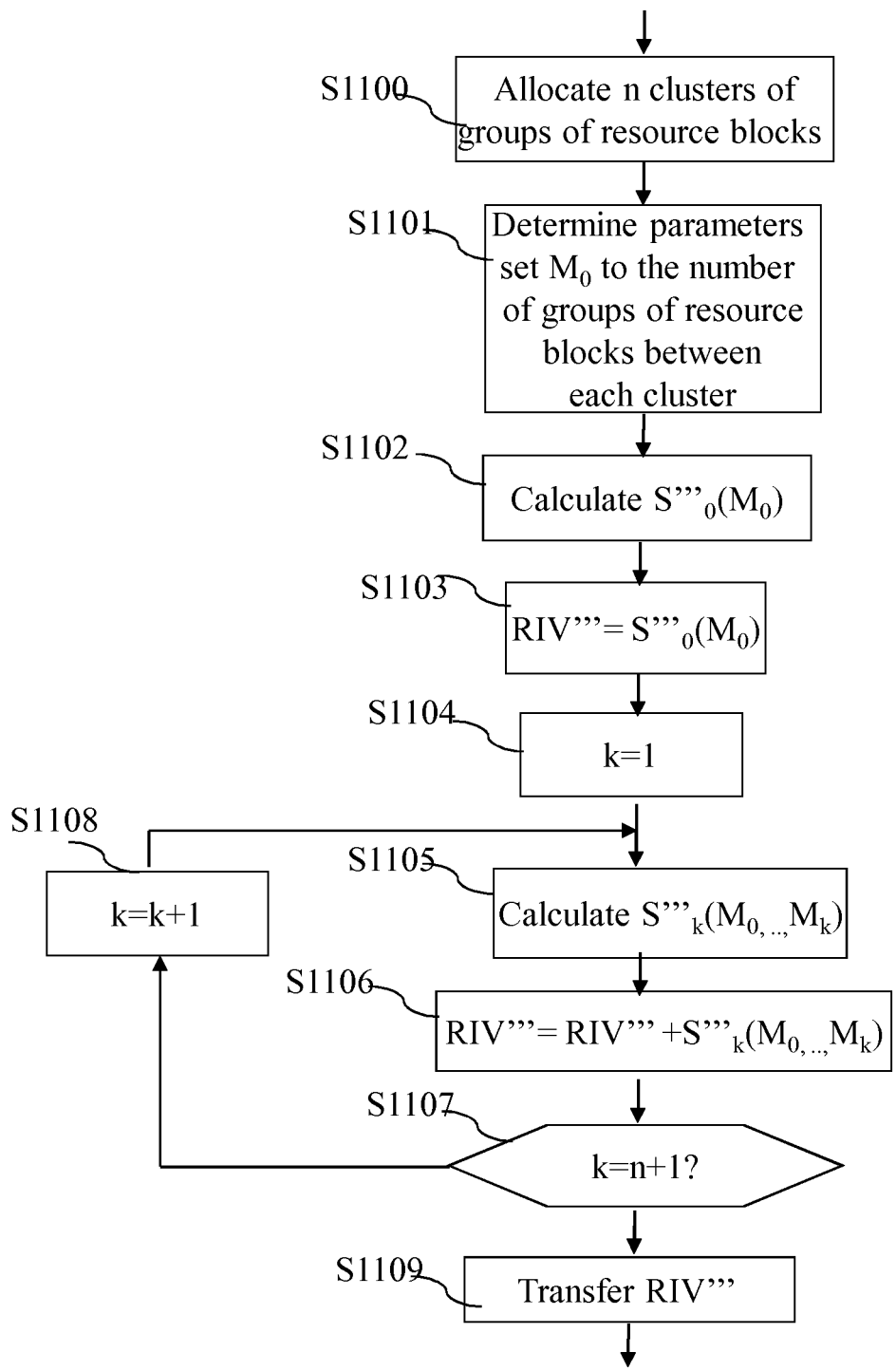
Figure 13:
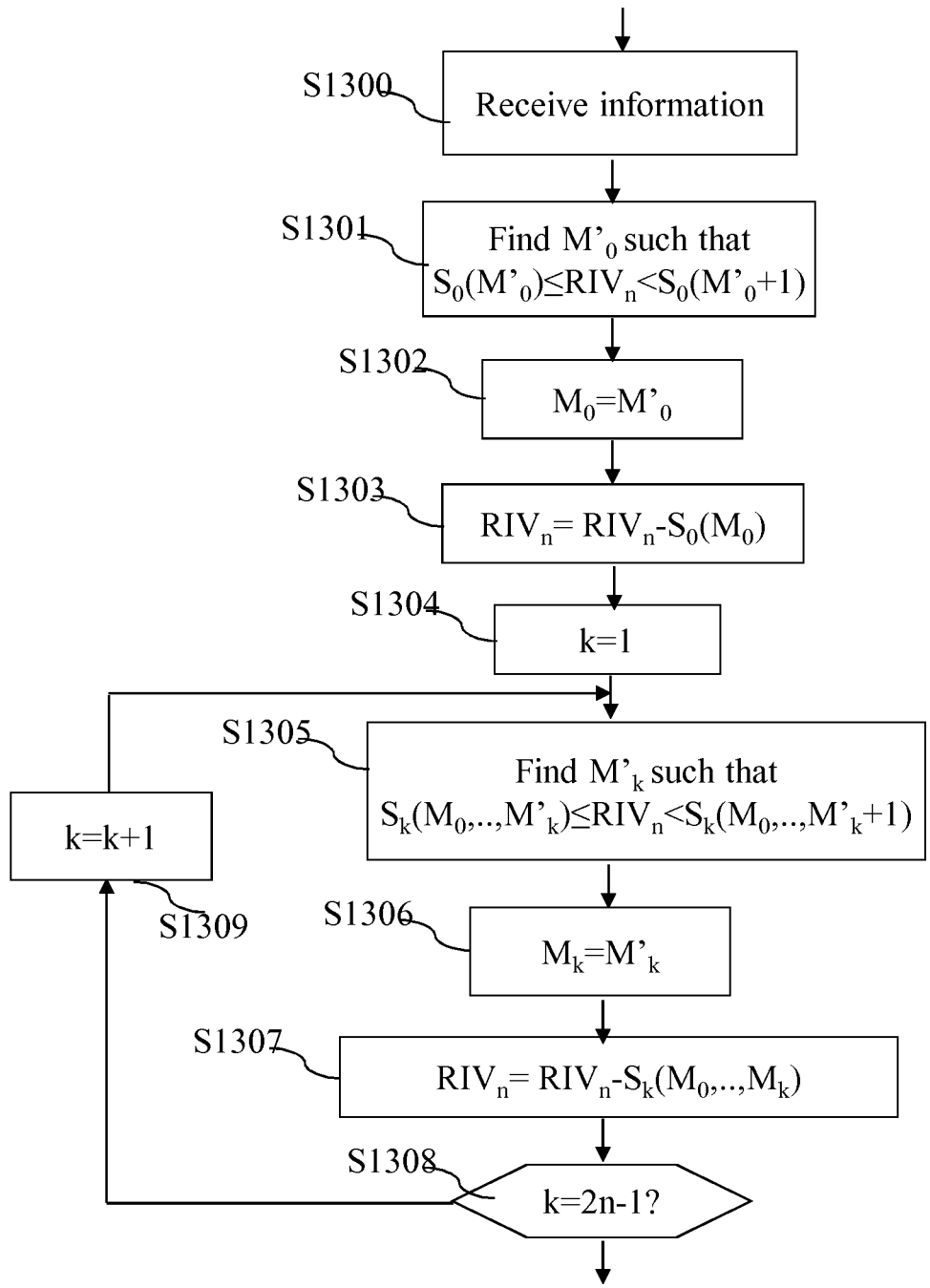
Figure 14:
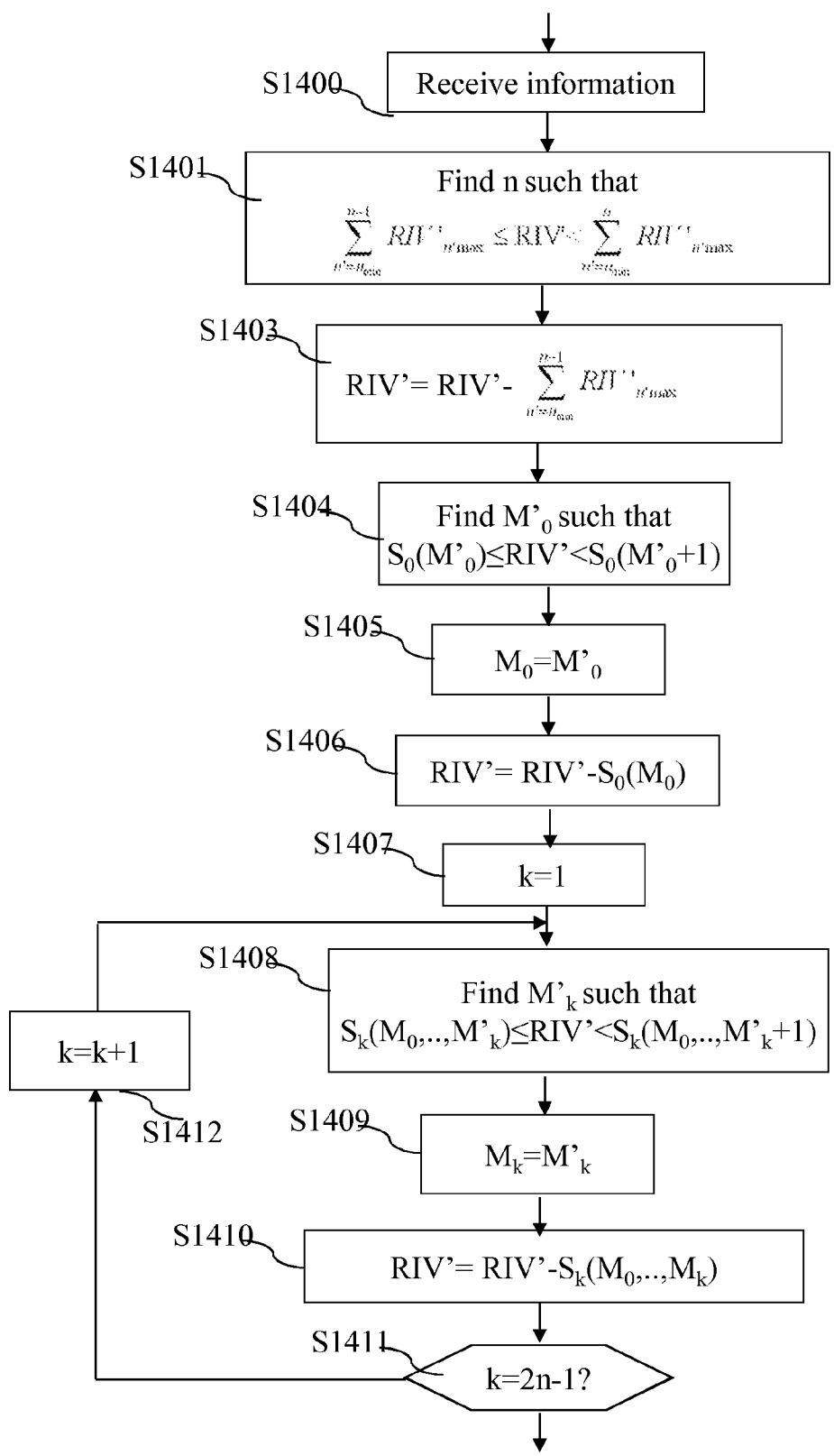
Figure 15:
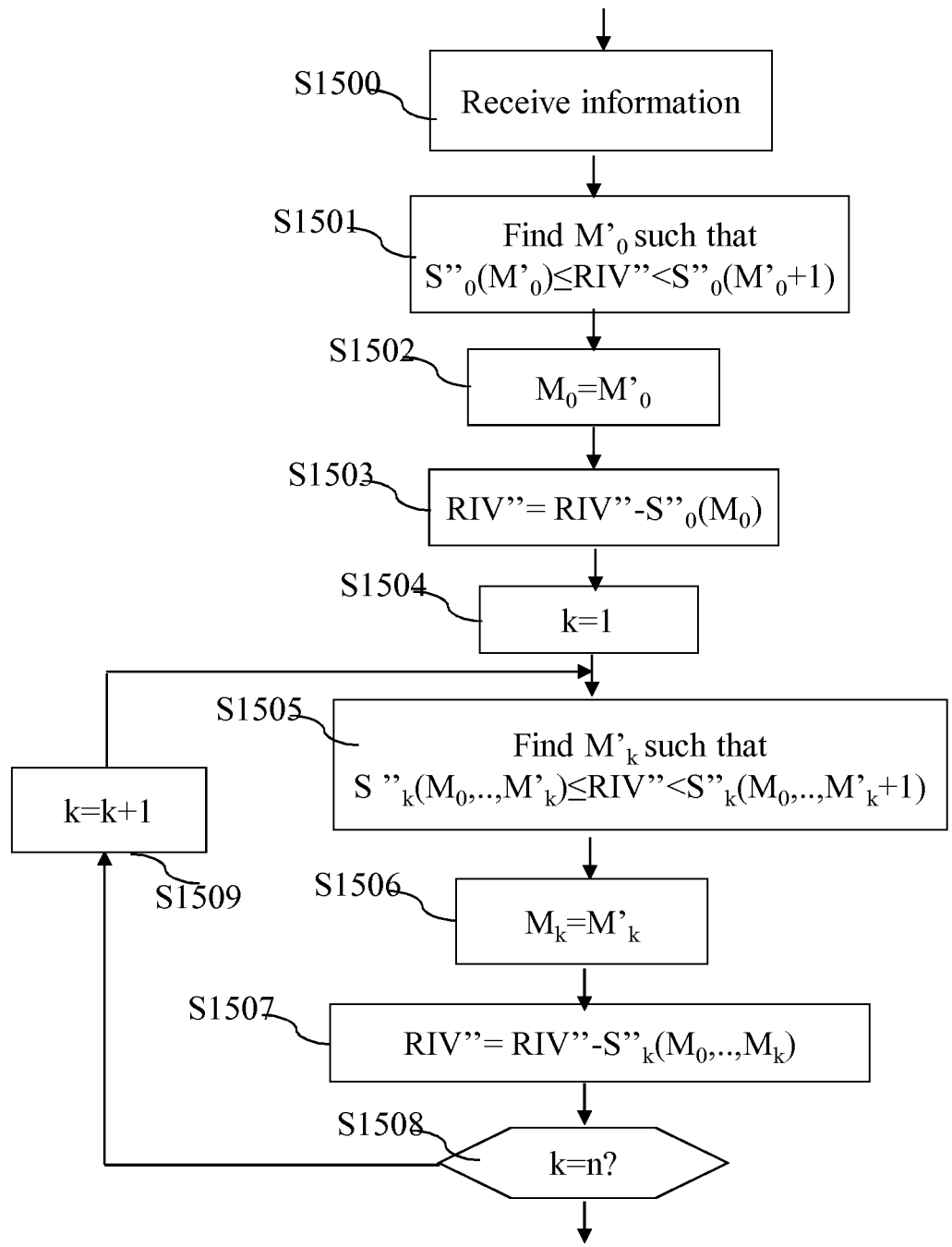
Figure 16:
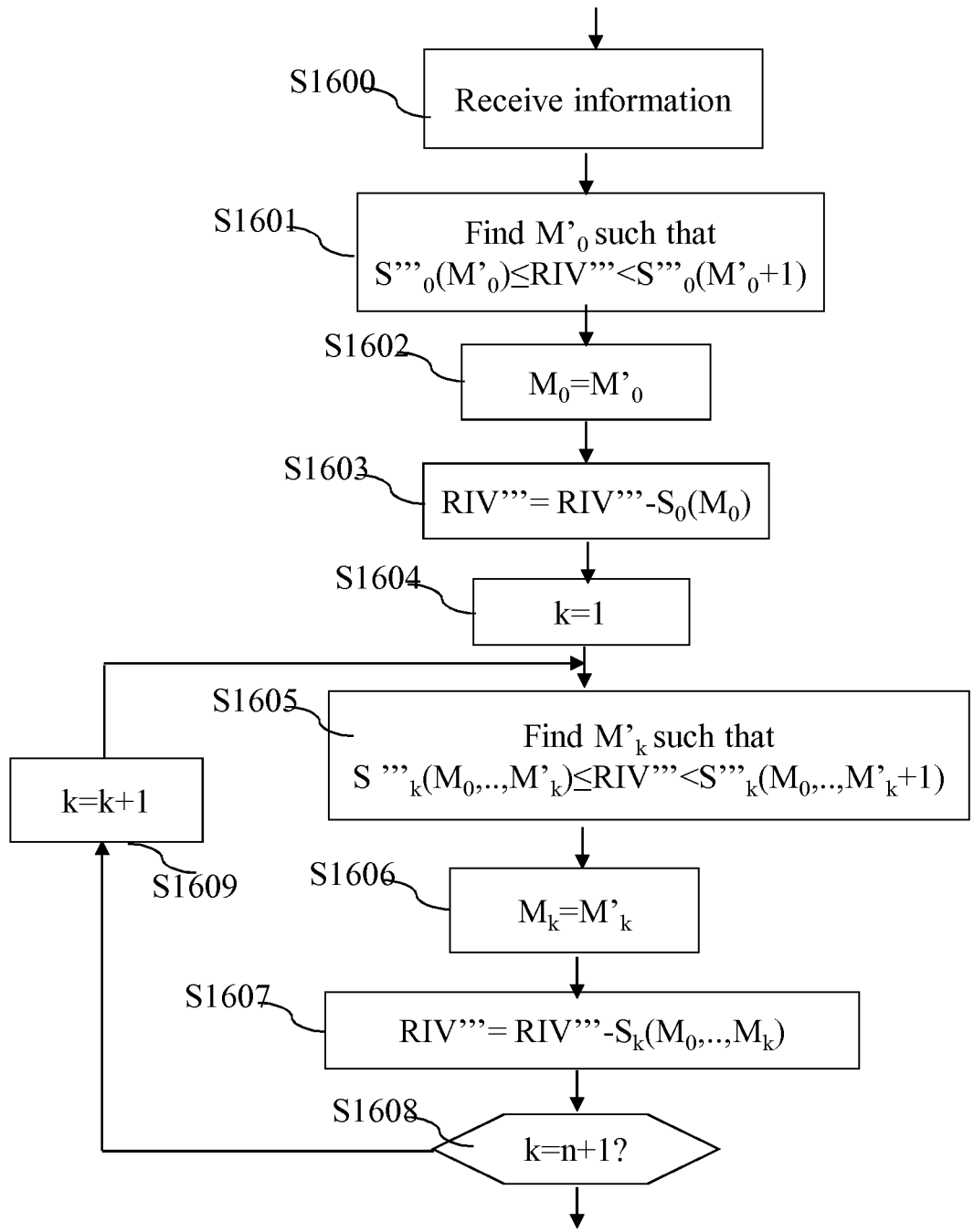

FIG. 7 discloses a first example of an algorithm executed by a base station in order to indicate the groups of resource blocks allocated to a mobile station according to a first mode of realisation of the present invention;

FIG. 8 discloses a second example of an algorithm executed by a base station in order to indicate the groups of resource blocks allocated to a mobile station according to a second mode of realisation of the present invention;

FIG. 9 discloses a third example of an algorithm executed by a base station in order to indicate the groups of resource blocks allocated to a mobile station according to a third mode of realisation of the present invention;

FIG. 10 represents a second example of three clusters of at least one group of resource blocks allocated to a mobile station and parameters according to the present invention;

FIG. 11 discloses a fourth example of an algorithm executed by a base station in order to indicate the groups of resource blocks allocated to a mobile station according to a fourth mode of realisation of the present invention;

FIG. 12 represents a third example of three clusters of at least one group of resource blocks allocated to a mobile station and parameters according to the present invention;

FIG. 13 discloses a first example of an algorithm executed by a mobile station according to the first mode of realisation of the present invention;

FIG. 14 discloses a second example of an algorithm executed by a mobile station according to the second mode of realisation of the present invention;

FIG. 15 discloses a third example of an algorithm executed by a mobile station according to the third mode of realisation of the present invention;

FIG. 16 discloses a fourth example of an algorithm executed by a mobile station according to the fourth mode of realisation of the present invention;

FIG. 1 represents a wireless cellular telecommunication network in which the present invention is implemented.

The present invention will be described in an example wherein the telecommunication system is a wireless cellular telecommunication system.

The present invention is also applicable to wireless or wired telecommunication systems like Local Area Networks.

In that case, the base station and mobile station are emitters and/or receivers.

In FIG. 1, one base station BS of the wireless cellular telecommunication network and a mobile station MS are shown.

The present invention is described when the resources of the wireless cellular telecommunication network to be used by the mobile station MS are allocated by a base station BS.

The resources of the wireless cellular telecommunication network are the frequency spectrum and/or time slots used by the wireless cellular telecommunication network. The frequency spectrum is, for example, decomposed into groups of resource blocks and each resource block comprises a predetermined number of sub-carriers, for example twelve.

It has to be noted here that in a variant a resource block may be composed of a single sub-carrier.

The present invention will be disclosed with groups of resource blocks. The present invention is also applicable to resource blocks or resources.

The base station BS is a base station of a wireless cellular telecommunication network comprising one or plural base stations.

Only one mobile station MS is shown for the sake of clarity but the wireless cellular telecommunication network may have a more important number of mobile stations MS to communicate with the base station BS.

The base station BS may be named a node or an access point.

The mobile station MS may be a personal computer, a peripheral device like a set top box, or a phone.

According to the invention, at least two non contiguous clusters of at least one group of resource blocks are allocated to one mobile station MS.

According to the invention, in order to indicate the n allocated clusters of at least one group of resource blocks, at least four and at most 2n parameters are needed.

If some supplementary constraints are imposed, like a common size for each cluster of one or plural contiguous groups of resource blocks or like a common spacing between clusters of at least one group of resource blocks, less than 2n independent parameters following a weighted sum constraint are needed as it will be disclosed herein after.

Let us denote by Q the number of parameters independent under weighted sum constraint that are necessary to indicate an allocation with n non-contiguous clusters. Let the Q parameters be noted $M_0 \ldots M_0 \ldots M_{Q-1}$.

The condition of independence under weighted sum constraint of Q parameters representative of n non-contiguous clusters allocation can be written as:

$$\begin{cases} \sum_{k=0}^{Q-1} q_k M_k \leq N_{RBG} + 1 \\ \sum_{k=0}^{Q-1} q_k = 2n \end{cases}$$

where $q_k$ is a coefficient which is representative of the number of occurrences of the parameter $M_k$ in the allocation. Coefficients $q_k$ are integer and strictly positive.

For example, $q_k$ may be the number of clusters of one or plural contiguous groups of resource blocks if the number of groups of resource blocks is identical for each cluster of one or plural contiguous groups of resource blocks and $M_k$ is the number of groups of resource blocks comprised in each cluster.

For example, $q_k$ is the number of clusters minus one if the clusters of one or plural contiguous groups of resource blocks are equally spaced and $M_k$ is the number of at least one group of resource blocks between two clusters of at least one group of resource blocks.

For Q parameters $(M_0 \ldots M_{Q-1})$ representative of an allocation with n clusters, the parameter $M_0$ can take values from one to:

$$\left(N_{RBG} + 1 - \sum_{p=1}^{Q-1} q_p\right) / q_0 = N_{RBG} + 1 - 2n + q_0/q_0.$$

Generally, for all $k=0 \ldots Q-1$ we can state that:

For any fixed $(M_0 \ldots M_{k-1})$, parameter $M_k$ can take values from 1 to:

$$\left(N_{RBG} + 1 - \sum_{p=0}^{k-1} q_p M_p - \sum_{p=k+1}^{Q-1} q_p\right) / q_k =$$

$$\left(N_{RBG} + 1 - 2n + q_k - \sum_{p=0}^{k-1} q_p(M_p - 1)\right) / q_k$$

According to the invention, the base station BS which handles the mobile station MS or any core network device of the wireless cellular telecommunication network:

allocates groups of resources blocks to the mobile station, the allocated groups of resources blocks dividing the set of resources into subsets of groups of resources blocks, determines, from the allocated groups of resources blocks, plural ordered parameters, each parameter being equal to a number of contiguous groups of resources blocks in a subset of at least one group of resources blocks corresponding to the parameter, the at least one group of resources blocks being not allocated to the mobile station or forming a cluster of one group of resources blocks or of plural contiguous groups of resources blocks allocated to the mobile station, calculates, for the first parameter, within the set of possible groups of resources blocks allocations, the number of possibilities of having in the corresponding subset, an amount of groups of resources blocks that is lower than the first parameter, calculates, for each following parameter, within the set of possible groups of resources blocks allocations, the number of possibilities of having for each subset corresponding to a parameter having a lower rank than said following parameter, an amount of groups of resources blocks that is equal to the parameter the subset corresponds to and having in the subset corresponding to said following parameter an amount of groups of resources blocks that is lower than said following parameter, determines information which enable a mobile station to identify which groups of resources blocks of the wireless telecommunication network are allocated to the mobile station by summing all the calculated numbers.

The mobile station:

receives information which enable the mobile station to identify which groups of resources blocks of the wireless telecommunication network are allocated to the mobile station, determines a number of possibilities of having a subset of at least one group of resources blocks corresponding to a first parameter, the subset comprising less than a first amount of groups of resources blocks, determines a number of possibilities of having a subset of at least one group of resources blocks corresponding to the first parameter, the subset comprising less than the first amount of groups of resources blocks plus one, selects the first amount of groups of resources blocks as a first parameter if the number of possibilities of having a subset of at least one group of resources blocks corresponding to the first parameter, the subset comprising less than the first amount of groups of resources blocks, is lower than or equal to the received information and if the number of possibilities of having a subset corresponding to the first parameter, the subset of at least one group of resources blocks comprising less than the first amount of groups of resources blocks plus one, is upper than the received information, modifies the information which enables the mobile station to identify which groups of resources blocks of the wireless telecommunication network are allocated to the mobile station by subtracting the number of possibilities of having a subset of at least one group of resources blocks corresponding to the first parameter, the subset comprising an amount of groups of resource blocks inferior to the first parameter, from the information which enables the mobile station to identify which groups of resources blocks of the wireless telecommunication network are allocated to the mobile station, and as far as all the parameters are not determined, determines for the following parameter, within the set of possible groups of resources blocks allocations:

a first number of possibilities of having for each subset of at least one group of resources blocks corresponding to a parameter having a lower rank than said following parameter, each subset comprising an amount of groups of resources blocks that is equal to the parameter the subset corresponds to and having a subset of at least one group of resources blocks corresponding to said following parameter comprising an amount of groups of resources blocks that is lower than a given value, a second number of possibilities of having for each subset of at least one group of resources blocks corresponding to a parameter having a lower rank than said following parameter, each subset comprising an amount of groups of resources blocks that is equal to the parameter the subset corresponds to and having a subset of at least one group of resources blocks corresponding to said following parameter comprising an amount of groups of resources blocks that is lower than a given value plus one, selects the given value as following parameter if the first number is lower than or equal to the modified information and if the second number is upper than the modified information, updates the modified information by subtracting the first number from the modified information, identifies among the set of groups of resources blocks that can be allocated in the wireless telecommunication network to the mobile station, which groups of resources blocks of the wireless telecommunication network are allocated to the mobile station according to the parameters when all the parameters are determined.

Figure 2:
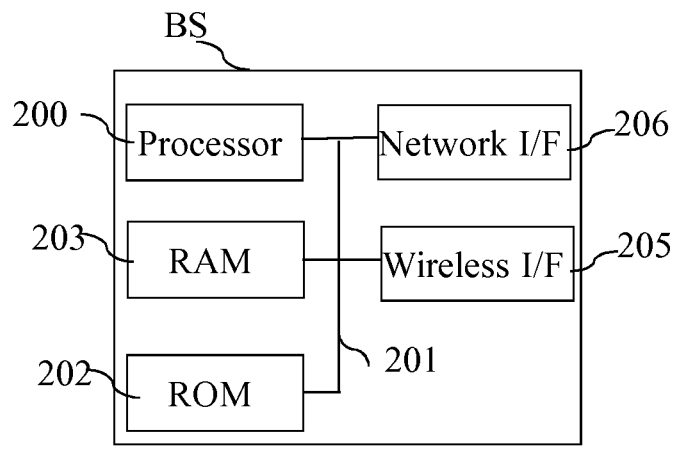
FIG. 2 is a diagram representing the architecture of a base station in which the present invention is implemented.

FIG. 2 is a diagram representing the architecture of a base station in which the present invention is implemented.

The base station BS has, for example, an architecture based on components connected together by a bus 201 and a processor 200 controlled by the programs as disclosed in FIGS. 7, 8, 9 and 11.

It has to be noted here that the base station BS may have an architecture based on dedicated integrated circuits.

The bus 201 links the processor 200 to a read only memory ROM 202, a random access memory RAM 203, a wireless interface 205 and a network interface 206.

The memory 203 contains registers intended to receive variables and the instructions of the program related to the algorithms as disclosed in FIGS. 7, 8, 9 and 11.

The processor 200 controls the operation of the network interface 206 and of the wireless interface 205.

The read only memory 202 contains instructions of the program related to the algorithms as disclosed in FIGS. 7, 8, 9 and 11, which are transferred, when the base station BS is powered on, to the random access memory 203.

The base station BS may be connected to a telecommunication network through the network interface 206. For example, the network interface 206 is a DSL (Digital Subscriber Line) modem, or an ISDN (Integrated Services Digital Network) interface, etc.

The wireless interface 205 comprises means for transferring information representative of the sub-carriers allocated to the mobile station MS.

Figure 4:
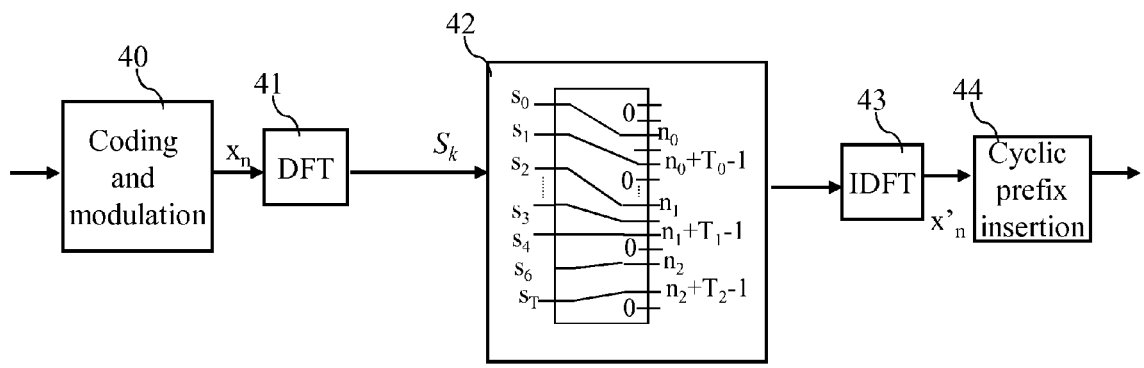
FIG. 4 illustrates the architecture of the encoder comprised in a mobile station according to a particular embodiment of the invention in frequency domain.
Figure 5:
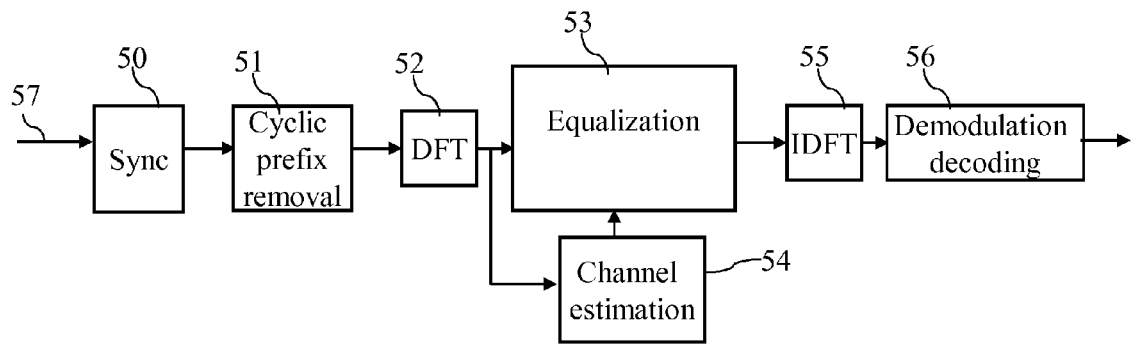
FIG. 5 illustrates the architecture of the decoder of a base station having one or several receive antennas according to a particular embodiment of the invention.

The wireless interface 205 comprises a decoder as disclosed in FIG. 5. The wireless interface 205 may comprise an encoder as disclosed in FIG. 4.

Figure 3:
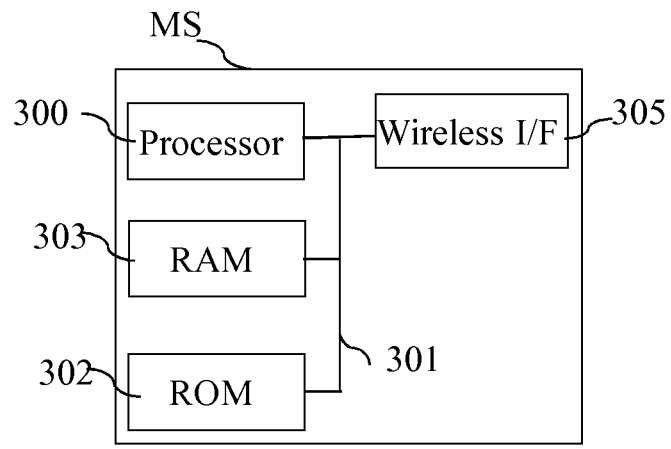
FIG. 3 is a diagram representing the architecture of a mobile station in which the present invention is implemented.

FIG. 3 is a diagram representing the architecture of a mobile station in which the present invention is implemented.

The mobile station MS has, for example, an architecture based on components connected together by a bus 301 and a processor 300 controlled by the programs as disclosed in FIGS. 13, 14, 15 and 16.

It has to be noted here that the mobile station MS may have an architecture based on dedicated integrated circuits.

The bus 301 links the processor 300 to a read only memory ROM 302, a random access memory RAM 303 and a wireless interface 305.

The memory 303 contains registers intended to receive variables and the instructions of the program related to the algorithms as disclosed in FIGS. 13, 14, 15 and 16.

The processor 300 controls the operation of the wireless interface 305.

The read only memory 302 contains instructions of the program related to the algorithms as disclosed in FIGS. 13, 14, 15 and 16, which are transferred, when the mobile station MS is powered on, to the random access memory 303.

The wireless interface 305 comprises means for mapping data on sub-carriers comprised in the clusters of sub-carriers allocated to the mobile station MS.

The wireless interface 305 comprises an encoder as disclosed in FIG. 4. The wireless interface 305 may comprise a decoder as disclosed in FIG. 5.

FIG. 4 illustrates the architecture of the encoder according to a particular embodiment of the invention in frequency domain.

Data to be transmitted are coded and organized as symbols by the coding and modulation module 40 giving a set of symbols $x_n$. Then the signal is spread in the frequency domain by the DFT (Discrete Fourier Transform) module 41. In a variant, the DFT module is replaced by a Fast Fourier Transform module or any other processing module.

In case of OFDMA, DFT module may not be needed.

The symbols spread in the frequency domain are mapped on sub-carriers comprised in the allocated frequency band by a frequency mapping module 42 which maps data to be transferred on sub-carriers. The frequency mapping module 42 comprises zero insertion and/or frequency shaping capabilities.

The frequency mapping module 42 maps symbols on the frequency band allocated to the mobile station MS. As the sub-carriers are not allocated in a contiguous sub-band, the frequency band is separated into several clusters. The frequency mapping module 42 maps symbols on the different clusters of the frequency band allocated to the mobile station MS.

In FIG. 4, the frequency mapping module 42 shows an example wherein $T=T_0+T_1+T_2$ symbols are mapped on T sub-carriers of three clusters of at least one group of resource blocks. A first cluster comprises the sub-carriers noted $n_0$ to $n_0+T_0-1$, a second cluster comprises the sub-carriers noted $n_1$ to $n_1+T_1-1$ and a third cluster comprises the sub-carriers noted $n_2$ to $n_2+T_2-1$.

The symbols outputted by the frequency mapping module 42 are transformed back in the time domain by the IDFT (Inverse Discrete Fourier Transform) module 43.

An optional cyclic prefix insertion module 44 can be applied before transmission through the antenna of the mobile station MS.

FIG. 5 illustrates the architecture of the decoder of a device according to a particular embodiment of the invention.

At least one signal 57 is received from at least one receive antenna. The synchronization module 50 synchronizes the received signal 57.

The optional cyclic prefix removal module 51 removes the cyclic prefix if used, to the synchronized signal.

The DFT module 52 executes a DFT on the synchronized signal on which the cyclic prefix has been removed or not. In a variant, the DFT module is replaced by a Fast Fourier Transform module or any other processing module.

A channel estimation module 54 will work on the signals provided by the DFT module 52. The output of the channel estimation module 54 commands an equalization module 53. The output of the equalization module 53 is processed by an inverse DFT module 55 before a classical channel decoding module 56 which treats the resulting signal.

In case of OFDMA, IDFT module 55 may not be needed. In other variants, it may be replaced with other processing modules.

The demodulating and decoding module 56 demodulates and decodes the symbols into data.

Figure 6:
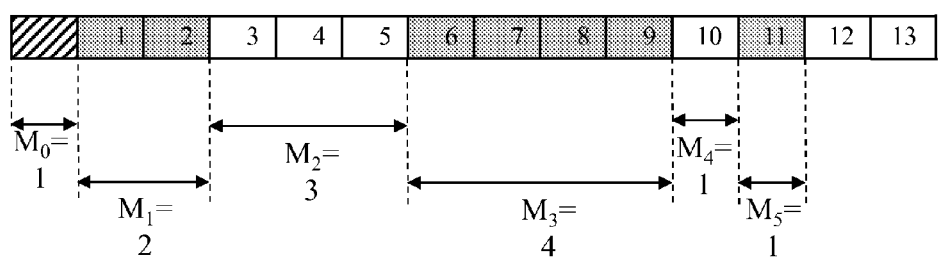
FIG. 6 represents a first example of three clusters of at least one group of resource blocks allocated to a mobile station and parameters according to the present invention.

FIG. 6 represents a first example of three clusters of at least one group of resource blocks allocated to a mobile station and parameters according to the present invention.

In the example of FIG. 6, three non contiguous clusters of one or plural contiguous groups of resource blocks are allocated to one mobile station MS.

FIG. 6 discloses fourteen groups of resource blocks. The first group of resource blocks which is hachured in FIG. 6, is a dummy one. Only $N_{RBG}$ equals thirteen groups of resource blocks, numbered here from one to thirteen, physically exist. Other conventions of smaller or larger numbering may exist.

The groups of resource blocks are ordered and have an index varying from 1 to 13. The groups of resource blocks are the ones of the set of resources of the wireless cellular telecommunication network which may be allocated to the mobile station MS.

The present invention intends to define information which enable a receiver like a mobile station MS to identify which groups of resource blocks are allocated to the mobile station, for example for uplink transmission.

In the example of FIG. 6, six parameters noted $M_0$ to $M_5$ are needed to represent resource allocation configuration of the mobile station MS.

The parameter $M_0$ represents the number plus one of physically existing groups of resource blocks which are not allocated to the mobile station MS and which have an index lower than the index of the first group of resource blocks of the first cluster of one or plural contiguous groups of resource blocks allocated to the mobile station MS. In the example of FIG. 6, $M_0$ is equal to one as there is a dummy group of resource blocks. The dummy group of resource blocks is virtual and considered as not allocated to the mobile station MS. Then, the first group of resource blocks which physically exists and having the lowest index within the set of groups of resource blocks is the first group of resource blocks of the first cluster of one or plural contiguous groups of resource blocks allocated to the mobile station MS. The subset of at least one group of resource blocks which is associated to the parameter $M_0$ comprises the dummy group of resource blocks.

The parameter $M_1$ represents the number of groups of resource blocks which are allocated to the mobile station MS and which belong to the first cluster of one or plural contiguous groups of resource blocks allocated to the mobile station MS. In the example of FIG. 6, $M_1$ is equal to two. The subset of at least one group of resource blocks which is associated to the parameter $M_1$ comprises the groups of resource blocks having the indexes 1 and 2.

The parameter $M_2$ represents the number of groups of resource blocks not allocated to the mobile station MS which are between the first cluster of one or plural contiguous groups of resource blocks allocated to the mobile station MS and the second cluster of one or plural contiguous groups of resource blocks allocated to the mobile station MS. In the example of FIG. 6, $M_2$ is equal to three. The subset of at least one group of resource blocks which is associated to the parameter $M_2$ comprises the groups of resource blocks having the indexes 3, 4 and 5.

The parameter $M_3$ represents the number of groups of resource blocks which are allocated to the mobile station MS and which belong to the second cluster of one or plural contiguous groups of resource blocks allocated to the mobile station MS. In the example of FIG. 6, $M_3$ is equal to four. The subset of at least one group of resource blocks which is associated to the parameter $M_3$ comprises the groups of resource blocks having the indexes 6, 7, 8 and 9.

The parameter $M_4$ represents the number of groups of resource blocks not allocated to the mobile station MS which are between the second cluster of one or plural contiguous groups of resource blocks allocated to the mobile station MS and the third cluster of one or plural contiguous groups of resource blocks allocated to the mobile station MS. In the example of FIG. 6, $M_4$ is equal to one. The subset of at least one group of resource blocks which is associated to the parameter $M_4$ comprises the group of resource blocks having the index 10.

The parameter $M_5$ represents the number of groups of resource blocks which are allocated to the mobile station MS and which belong to the third cluster of one or plural contiguous groups of resource blocks allocated to the mobile station MS. In the example of FIG. 6, $M_5$ is equal to one. The subset of at least one group of resource blocks which is associated to the parameter $M_5$ comprises the group of resource blocks having the index 11.

FIG. 7 discloses a first example of an algorithm executed by a base station in order to indicate the groups of resource blocks allocated to a mobile station according to a first mode of realisation of the present invention.

In the first mode of realisation, the number n of clusters of at least one group of resource blocks is known by the mobile station MS.

According to the first example, clusters of at least one group of resource blocks can take any size with any spacing, Q=2n and $q_k=1$ for any k=0 . . . 2n−1.

$M_0 \ldots M_{2n-1}$ parameters represent the n different sizes of allocated clusters of least one group of resource blocks and the n different gaps between clusters of at least one group of resource blocks. They can be ordered according to any predetermined common rule shared by the base station BS and the mobile stations MS.

The weighted sum constraint becomes:

$$\sum_{k=0}^{2n-1} M_k \le N_{RBG} + 1.$$

There can be at most $n_{max}=(N_{RBG}+1)/2$ clusters of at least one group of resource blocks.

The parameter $M_0$ can take values from 1 to $N_{RBG}-2n+2$. With a fixed $M_0$, there are $C(N_{RBG}+1-M_0,2n-1)$ possible allocations where C(x,y) is equal to $C_x^y$ which is the number of possible combinations of x elements among y elements.

For any fixed parameter $M_0$, the parameter $M_1$ can take values from 1 to $N_{RBG}-M_0-2n+3$.

With a fixed couple of parameters $(M_0,M_1)$, there are $C(N_{RBG}+1-M_0-M_1,2n-2)$ possible allocations.

For any fixed $(M_0,M_1)$, parameter $M_2$ can take values from 1 to $N_{RBG}-M_0-M_1-2n+4$. With a fixed $(M_0, M_1, M_2)$, there are $C(N_{RBG}+1-M_0-M_1-M_2,2n-3)$ possible allocations.

For any fixed $(M_0, \ldots M_{k-1})$, parameter $M_k$ can take values from 1 to $N_{RBG}-$ $$\sum_{p=0}^{k-1} M_p - 2n + k + 2.$$

With a fixed $(M_0, M_1, \ldots, M_k)$, there are $$C\left(N_{RBG} + 1 - \sum_{p=0}^{k} M_p, 2n - k - 1\right)$$

possible allocations.

For example, the present algorithm will be described when it is executed by the processor 200 of the base station BS.

It has to be noted here that in a variant, instead of being executed by the base station BS, the present algorithm is executed by a core network device not shown in FIG. 1 of the wireless cellular telecommunication device for plural base stations BS.

The present algorithm is executed each time clusters of sub-carriers are allocated to a mobile station MS handled by the base station BS.

At step S700, the processor 200 allocates groups of resource blocks to the mobile station MS. The allocated groups of resource blocks are allocated for example according to channel conditions and/or according to required quality of service. The allocated groups of resource blocks are divided into n clusters of one or plural contiguous groups of resource blocks.

For example, the allocated groups of resource blocks are the ones disclosed in FIG. 6.

At next step S701, the processor 200 determines 2n parameters from the allocated groups of resource blocks.

$M_0$ is equal to one, $M_1$ is equal to two, $M_2$ is equal to three, $M_3$ is equal to four, $M_4$ is equal to one and $M_5$ is equal to one.

At next step S702, the processor 200 calculates a sum $S_0(M_0)$ according to the following formula:

$$S_0(M_0) = \sum_{m_0=1}^{M_0-1} C(N_{RBG} + 1 - m_0, 2n - 1).$$

If $M_0 = 1$, $$S_0(M_0) = 0.$$

According to the example of FIG. 6, $S_0(M_0)=0$.

The sum $S_0(M_0)$ is the number of possibilities of having in the subset corresponding to $M_0$, an amount of groups of resource blocks $m_0$ that is lower than the first parameter $M_0$.

At next step S703, the processor 200 sets the value of the information $RIV_n$ enabling the mobile station MS to identify which resources of the wireless telecommunication network are allocated to the mobile station MS to the value $S_0(M_0)$.

At next step S704, the processor 200 sets the value of the variable k to one.

At next step S705, the processor 200 calculates a sum $S_k(M_0, \ldots, M_k)$ according to the following formula:

$$S_k(M_0, \ldots, M_k) = \sum_{m_k=1}^{M_k-1} C\left(N_{RBG} + 1 - \sum_{p=0}^{k-1} M_p - m_k, 2n - 1 - k\right)$$

(and $S_k(M_0, \ldots, M_k) = 0$

The sum $S_k(M_0, \ldots, M_k)$ is the total number of possible resource allocations with the k subsets of groups of resource blocks comprising respectively an amount of groups of resource blocks of exactly $M_0, \ldots M_{k-1}$, and with a (k+1)-th subset of groups of resource blocks comprising an amount of resources $m_k$ inferior to the value of the parameter $M_k$.

For example, for k=1 and respectively 2, the following sums are computed:

$$S_1(M_0, M_1) = \sum_{m_1=1}^{M_1-1} C(N_{RBG} + 1 - M_0 - m_1, 2n - 2)$$

and if $M_1 = 1$, $S_1(M_0, M_1) = 0$, $$S_2(M_0, M_1, M_2) = \sum_{m_2=1}^{M_2-1} C(N_{RBG} + 1 - M_0 - M_1 - m_2, 2n - 3)$$

and if $M_2 = 1$, $S_2(M_0, M_1, M_2) = 0$.

In other words, for each value of k, with k=1 ... 2n−1, the processor 200 calculates, within the set of possible resource allocations, the number of possibilities of having for each subset corresponding to a parameter $M_0$ to $M_{k-1}$ having a lower rank than the parameter $M_k$ an amount of groups of resources blocks that is equal to the parameter $M_0$ to $M_{k-1}$ the subset corresponds to and having in the subset corresponding to the parameter $M_k$ an amount of groups of resources blocks that is lower than the parameter $M_k$.

At next step S706, the processor 200 sets the value of the information $RIV_n$ enabling the mobile station MS to identify which resources of the wireless telecommunication network are allocated to the mobile station MS to the value $RIV_n + S_k(M_0, \ldots, M_k)$.

At next step S707, the processor 200 checks if k is equal to 2n−1. If k is equal to 2n−1, the processor 200 moves to step S709. Otherwise, the processor 200 moves to step S708, increments the variable k by one and returns to step S705.

At step S709, the processor 200 commands the transfer of the information $RIV_n$ enabling the mobile station MS to identify which resources of the wireless telecommunication network are allocated to the mobile station MS.

According to the example of FIG. 6:
S0(M0)=0,
$S_1(M_0, M_1)$=495,
$S_2(M_0, M_1, M_2)$=204,
$S_3(M_0, M_1, M_2, M_3)$=46,
$S_4(M_0, M_1, M_2, M_3, M_4)$=0,
and $S_5(M_0, M_1, M_2, M_3, M_4, M_5)$=0.
$RIV_n$ is equal to 745.

FIG. 8 discloses a second example of an algorithm executed by a base station in order to indicate the groups of resource blocks allocated to a mobile station according to a second mode of realisation of the present invention.

In the second mode of realisation, the number n of clusters of at least one group of resource blocks may vary from $n_{min}$ to $n_{max}$, $n_{min}$ being known by the mobile station MS. $n_{min}$ is different from $n_{max}$ and $n_{min}$ is upper than one. $n_{max}$ is equal to $(N_{RBG}+1)/2)$.

For example, the present algorithm will be described when it is executed by the processor 200 of the base station BS.

It has to be noted here that in a variant, instead of being executed by the base station BS, the present algorithm is executed by a core network device not shown in FIG. 1 of the wireless cellular telecommunication device for plural base stations BS.

The present algorithm is executed each time clusters of sub-carriers are allocated to a mobile station MS handled by the base station BS.

At step S800, the processor 200 allocates groups of resource blocks to the mobile station MS. The allocated groups of resource blocks are allocated for example according to channel conditions and/or according to required quality of service. The allocated groups of resource blocks are divided into n clusters of at least one group of resource blocks.

For example, the allocated groups of resource blocks are the ones disclosed in FIG. 6.

At next step S801, the processor 200 determines 2n parameters from the allocated groups of resource blocks.

$M_0$ is equal to one, $M_1$ is equal to two, $M_2$ is equal to three, $M_3$ is equal to four, $M_4$ is equal to one and $M_5$ is equal to one, $n_{min}$ is equal to two, $n_{max}$ is equal to seven and n is equal to three.

At next step S802, the processor 200 calculates the number of all possible resource allocations containing n' clusters out of $N_{RBG}$ groups of resource blocks, wherein n' varies from $n_{min}$ to n minus 1:

$$\sum_{n'=n_{min}}^{n-1} C(N_{RBG} + 1, 2n').$$

At next step S803 the processor 200 calculates a sum $S_0(M_0)$ according to the following formula:

$$S_0(M_0) = \sum_{m_0=1}^{M_0-1} C(N_{RBG} + 1 - m_0, 2n - 1).$$

If $M_0 = 1$, $S_0(M_0) = 0$.

According to the example of FIG. 6, $S_0(M_0)$=0.

The sum $S_0(M_0)$ is the number of possibilities of having in subset corresponding to $M_0$, an amount of groups of resource blocks $m_0$ that is lower than the first parameter $M_0$.

At next step S804, the processor 200 sets the value of the information $RIV_n$ enabling the mobile station MS to identify which resources of the wireless telecommunication network are allocated to the mobile station MS to the value $S_0(M_0)$.

At next step S805, the processor 200 sets the variable k to one value.

At next step S806, the processor 200 calculates a sum $S_k(M_0, \ldots, M_k)$ according to the following formula:

$$S_k(M_0, \ldots, M_k) = \sum_{m_k=1}^{M_k-1} C\left(N_{RGB} + 1 - \sum_{p=0}^{k-1} M_p - m_k, 2n - 1 - k\right)$$

(and $S_k(M_0, \ldots, M_k) = 0$ if $M_k = 1$).

The sum $S_k(M_0, \ldots, M_k)$ is the total number of possible resource allocations with the k subsets of groups of resource blocks comprising respectively an amount of groups of resource blocks of exactly $M_0, \ldots M_{k-1}$, and with a (k+1)-th subset of groups of resource blocks comprising an amount of resources $m_k$ inferior to the value of the parameter $M_k$.

In other words, for each value of k, with k=1 ... 2n-1, the processor 200 calculates, within the set of possible groups of resource blocks allocations, the number of possibilities of having for each subset corresponding to a parameter $M_0$ to $M_{k-1}$ having a lower rank than the parameter $M_k$ an amount of groups of resource blocks that is equal to the corresponding parameter $M_0$ to $M_{k-1}$ and having in the subset corresponding to the parameter $M_k$ an amount of groups of resource blocks that is lower than the parameter $M_k$.

At next step S807, the processor 200 sets the value of the information RIV' enabling the mobile station MS to identify which resources of the wireless telecommunication network are allocated to the mobile station MS to the value RIV'+$S_k$ ($M_0, \ldots, M_k$).

At next step S808, the processor 200 checks if k is equal to 2n-1. If k is equal to 2n-1, the processor 200 moves to step S810. Otherwise, the processor 200 moves to step S809, increments the variable k by one and returns to step S806.

At step S810, the processor 200 calculates the information RIV' enabling the mobile station MS to identify which resources of the wireless telecommunication network are allocated to the mobile station MS according to the following formula:

$$RIV'M_0 \ldots M_{2n-1} = \sum_{n'=n_{min}}^{n-1} C(N_{RGB}+1, 2n') + RIV'M_0 \ldots M_{2n-1}$$

At next step S811, the processor 200 commands the transfer of the information RIV' enabling the mobile station MS to identify which resources of the wireless telecommunication network are allocated to the mobile station MS According to the above mentioned example:
$C(N_{RBG}+1, 2n')=1001$
$S_0(M_0)=0$,
$S_1(M_0,M_1)=495$,
$S_2(M_0,M_1,M_2)=204$,
$S_3(M_0,M_1,M_2,M_3)=46$,
$S_4(M_0,M_1,M_2,M_3,M_4)=0$,
and $S_5(M_0,M_1,M_2,M_3,M_4,M_5)=0$.
RIV' is equal to 1746.

FIG. 9 discloses a third example of an algorithm executed by a base station in order to indicate the groups of resource blocks allocated to a mobile station according to a third mode of realisation of the present invention.

In the third mode of realisation, the allocated clusters have the same number of groups of resource blocks. The number n of clusters of at least one group of resource blocks is known by both the base station BS and mobile station MS.

For an allocation of n clusters having the same number of groups of resource blocks, Q=n+1 independent parameters are needed, under a weighted sum constraint $$\sum_{k=0}^{Q-1} q_k M_k \le N_{RBG} + 1.$$

The Q parameters represent the n gaps between clusters and the group of groups of resource blocks which are not allocated to the mobile station and which has or have an index lower than the index of the first group of resource blocks allocated to the mobile station MS, plus the number of groups of resource blocks comprised in each cluster.

These parameters may appear in any order. The coefficient q corresponding to the parameter representative of number of groups of resource blocks comprised in each cluster is equal to n. All the others coefficients are equal to one.

Let $M_r$ be the parameter corresponding to the number of groups of resource blocks comprised in each cluster and let us suppose in a first instance that r>0. The weighted sum constraint becomes:

$$nM_r + \sum_{\substack{k=0 \\ k \ne r}}^{n} M_k \le N_{RBG} + 1.$$

For all k<r, for any fixed parameter ($M_0 \ldots M_{k-1}$), the parameter $M_k$ takes values from 1 to $$M_{k,max}|_{k<r} = N_{RBG} + 2 - 2n + k - \sum_{p=0}^{k-1} M_p$$

where $|_{k<r}$ denotes the condition k<r. For any fixed ($M_0 \ldots M_k$), there are:

$$\sum_{M_r=1}^{floor\left[\left(N_{RGB}+2-\sum_{p=0}^{k} M_p - n + k\right)/n\right]} C\left(N_{RBG} + 1 - \sum_{p=0}^{k} M_p - nM_r, n-k-1\right)$$

possibilities of allocation where floor(x) is the integer part of x.

For any fixed ($M_0 \ldots M_{r-1}$), $M_r$ takes values from 1 to $$M_{r,max} = floor\left[\left(N_{RGB} + 1 - \sum_{p=0}^{r-1} M_p - n + r\right)/n\right].$$

For any fixed ($M_0 \ldots M_r$), there are $$C\left(N_{RBG} + 1 - \sum_{p=0}^{r-1} M_p - nM_r, n - r\right)$$

possible resource allocations.

For all k>r, for any fixed ($M_0 \ldots M_{k-1}$), the parameter $M_k$ tales values from 1 to $$M_{k,max}|_{k>r} = N_{RBG} + 1 - n + k - \sum_{\substack{p=0 \\ p \ne r}}^{k-1} M_p - nM_r.$$

For any fixed $(M_0 \ldots M_k)$, there are $$C\left(N_{RBG} + 1 - \sum_{\substack{p=0 \\ p \neq k}}^{k} M_p - nM_r, n - k\right)$$

possible combinations.

Then, for all $k=0 \ldots n$, the number of groups with $m_p = M_p$, for $p<k$, $m_k<M_k$, and any choice of $m_{k+1 \ldots n}$, $$S_{k,eqclusters}(M_0, \ldots M_k) = \sum_{m_k=1}^{M_k-1} \sum_{M_r=1}^{floor\left[\left(N_{RGB}+2-\sum_{p=0}^{k-1}M_p-m_k-n+k\right)/n\right]}$$

$$C\left(N_{RBG} + 1 - \sum_{p=0}^{k-1} M_p - m_k - nM_r, n - k - 1\right),$$

if $k < r$ $$\sum_{m_k=1}^{M_k-1} C\left(N_{RBG} + 1 - \sum_{p=0}^{r-1} M_p - nm_r, n - r\right),$$

if $k = r$ $$\sum_{m_k=1}^{M_k-1} C\left(N_{RBG} + 1 - \sum_{\substack{p=0 \\ p \neq k}}^{k-1} M_p - m_k - nM_r, n - k\right),$$

if $k > r$.

The information RIV" enabling the mobile station MS to identify which resources of the wireless telecommunication network are allocated to the mobile station MS is equal to:

$$RIV''(M_0, M_1, \ldots, M_n) = \sum_{k=0}^{n} S_{k,eqclusters}(M_0, \ldots, M_k).$$

The inventors of the present invention have found that by selecting $M_o$ as being the number of groups of resource blocks comprised in each of the clusters, the above mentioned formulas can be simplified.

The weighted sum constraint becomes:

$$nM_0 + \sum_{k=1}^{n} M_k \leq N_{RBG} + 1$$

$M_0$ takes values from 1 to $floor((N_{RBG}+1-n)/n)$. For any fixed $M_0$ there are $C(N_{RBG}+1-nM_0,n)$ possible combinations.

For any $k>0$, for any fixed $(M_0 \ldots M_{k-1})$ parameters, the parameter $M_k$ takes values from 1 to $$M_{k,max} = N_{RBG} + 1 - n + k - nM_0 - \sum_{p=1}^{k-1} M_p.$$

For any fixed $(M_0 \ldots M_k)$ parameters, there are $$C\left(N_{RBG} + 1 - \sum_{p=1}^{k} M_p - nM_0, n - k\right)$$

possible allocations.

Overall, there are $$RIV''_{n,max} = \sum_{M_0=1}^{floor\ N_{RBG}+1-n/n} CN_{RBG} + 1 - nM_0, n$$

possible allocations with n equal clusters.

For example, the present algorithm will be described when it is executed by the processor 200 of the base station BS.

It has to be noted here that in a variant, instead of being executed by the base station BS, the present algorithm is executed by a core network device not shown in FIG. 1 of the wireless cellular telecommunication device for plural base stations BS.

The present algorithm is executed each time clusters of sub-carriers are allocated to a mobile station MS handled by the base station BS.

At step S900, the processor 200 allocates groups of resource blocks to the mobile station MS. The allocated groups of resource blocks are allocated for example according to channel conditions and/or according to required quality of service.

At next step S901, the processor 200 determines the parameters from the allocated groups of resource blocks and sets $M_0$ to the number of groups of resource blocks which are allocated to the mobile station MS in each cluster of one or plural contiguous groups of resource blocks.

For example, the allocated groups of resource blocks and the determined parameters are as disclosed in FIG. 10.

FIG. 10 represents a second example of three clusters of at least one group of resource blocks allocated to a mobile station and parameters according to the present invention.

In the example of FIG. 10, three clusters of at least one group of resource blocks are allocated to one mobile station MS and are not contiguous. Each allocated cluster comprises the same number of groups of resource blocks.

FIG. 10 discloses fourteen groups of resource blocks. The first group of resource blocks which is hachured in FIG. 10, is a dummy one. The ordered groups of resource blocks having an index varying from 1 to 13 are the one of the wireless cellular telecommunication network which may be allocated to the mobile station MS. Four parameters noted $M_o$ to $M_3$ are needed to represent the groups of resource blocks which are allocated to the mobile station MS.

The parameter $M_0$ represents the number of groups of resource blocks which are allocated to the mobile station MS in each cluster of one or plural contiguous groups of resource blocks. In the example of FIG. 10, $M_0$ is equal to two. The subset of at least one group of resource blocks which comprises the groups of resource blocks having the indexes 2 and 3 is associated to the parameter $M_0$.

The subset of at least one group of resource blocks which comprises the groups of resource blocks having the indexes 7 and 8 is associated to the parameter $M_0$.

The subset of at least one group of resource blocks which comprises the groups of resource blocks having the indexes 11 and 12 is associated to the parameter $M_0$.

The parameter $M_1$ represents the number plus one of physically existing groups of resource blocks which are not allocated to the mobile station MS and which have an index inferior to the index of the first group of resource blocks of the first cluster of one or plural contiguous groups of resource blocks allocated to the mobile station MS. In the example of FIG. 10, $M_1$ is equal to two. The subset of at least one group of resource blocks which comprises the dummy group of resource blocks and the group of resource blocks having the index 1 is associated to the parameter $M_1$.

The parameter $M_2$ represents the number of groups of resource blocks which are between the first cluster of one or plural contiguous groups of resource blocks allocated to the mobile station MS and the second cluster of one or plural contiguous groups of resource blocks allocated to the mobile station MS. In the example of FIG. 10, $M_2$ is equal to three. The subset of at least one group of resource blocks which comprises the groups of resource blocks having the indexes 4, 5 and 6 is associated to the parameter $M_2$.

The parameter $M_3$ represents the number of groups of resource blocks which are between the second cluster of one or plural contiguous groups of resource blocks allocated to the mobile station MS and the third cluster of one or plural contiguous groups of resource blocks allocated to the mobile station MS. In the example of FIG. 10, $M_3$ is equal to two. The subset of at least one group of resource blocks which comprises the groups of resource blocks having the indexes 9 and 10 is associated to the parameter $M_3$.

At next step S902, the processor 200 calculates a sum $S''_0(M_0)$ according to the following formula:

$$S''_0(M_0) = \sum_{m_0=1}^{M_0-1} C(N_{RBG} + 1 - nm_0, n). \text{ If } M_0 = 1, S_0 = 0.$$

According to the example of FIG. 10, $S''_0(M_0)=165$.

The sum $S''_0(M_0)$ is the number of possible resource allocations with $m_0 < M_0$. Here, this is the number of possible resource allocation configurations with equal clusters containing less than $M_0$ resource block groups each.

At next step S903, the processor 200 sets the value of the information RIV" enabling the mobile station MS to identify which resources of the wireless telecommunication network are allocated to the mobile station MS to the value $S''_0(M_0)$.

At next step S904, the processor 200 sets the value of the variable k to one.

At next step S905, the processor 200 calculates a sum $S''_k(M_0, \ldots, M_k)$ according to the following formula:

$$S''_k(M_0 \ldots M_k) = \sum_{m_k=1}^{M_k-1} C\left(N_{RBG} + 1 - \sum_{p=1}^{k-1} M_p - nM_0 - m_k, n - k\right)$$

and $$S''_k(M_0, \ldots, M_k) = 0 \text{ if } M_k = 1.$$

The sum $S_k(M_0, \ldots, M_k)$ is the total number of possible resource allocations with the k subsets of groups of resource blocks comprising respectively an amount of groups of resource blocks of exactly $M_0, \ldots M_{k-1}$, and with a (k+1)-th subset of groups of resource blocks comprising an amount of resources $m_k$ inferior to the value of the parameter $M_k$.

In other words, for each value of k, with k=1 . . . n, the processor 200 calculates, within the set of possible groups of resource blocks allocations, the number of possibilities of having for each subset corresponding to a parameter $M_0$ to $M_{k-1}$ having a lower rank than the parameter $M_k$ an amount of groups of resource blocks that is equal to the corresponding parameter $M_0$ to $M_{k-1}$ and having in the subset corresponding to the parameter $M_k$ an amount of groups of resource blocks that is lower than the parameter $M_k$.

At next step S906, the processor 200 sets the value of the information RIV" enabling the mobile station MS to identify which resources of the wireless telecommunication network are allocated to the mobile station MS to the value RIV"+$S''_k$ $(M_0, \ldots, M_k)$.

At next step S907, the processor 200 checks if k is equal to n. If k is equal to n, the processor 200 moves to step S909. Otherwise, the processor 200 moves to step S908, increments the variable k by one and returns to step S905.

At next step S909, the processor 200 commands the transfer of the information RIV" enabling the mobile station MS to identify which resources of the wireless telecommunication network are allocated to the mobile station MS According to the above mentioned example:
$S_0''(M_0)=165$,
$S_1''(M_0,M_1)=21$,
$S_2''(M_0,M_1,M_2)=9$,
and $S_3''(M_0,M_1,M_2,M_3)=1$.
RIV" is equal to 196.

It has to be noted here that in a variant, the number of clusters may be decided by the base station BS and is not known by the mobile station MS.

In such case, instead of setting at step S903 the value of the information RIV" enabling the mobile station MS to identify which resources of the wireless telecommunication network are allocated to the mobile station MS to the value $S_0''(M_0)$, the processor 200 sets the value of the information RIV" enabling the mobile station MS to identify which resources of the wireless telecommunication network are allocated to the mobile station MS to the value $$S_0''(M_0) + \sum_{n'=n_{min}}^{n-1} RIV''_{n',max} \text{ where}$$

$$RIV''_{n',max} = \sum_{M_0=1}^{floor\ NRBG+1-n'/n'} CN_{RBG} + 1 - n'M_0, n'.$$

FIG. 11 discloses a fourth example of an algorithm executed by a base station in order to indicate the groups of resource blocks allocated to a mobile station according to a fourth mode of realization of the present invention.

In the fourth mode of realization, the allocated clusters are spaced by the same number of groups of resource blocks. The number n of clusters of at least one group of resource blocks is known by both the base station BS and the mobile station MS.

Here, Q=n+2 parameters are necessary. One parameter for the inter-clusters gaps, one parameter is for the number plus one of physically existing groups of resource blocks not allocated to the mobile station MS having an index value lower than the first group of resource blocks allocated to the mobile station MS and n parameters for the n cluster sizes.

To simplify the formulas, the common inter cluster gap value is the first parameter, the second parameter is the number plus one of physically existing groups of resource blocks not allocated to the mobile station MS and having an index value lower than the first group of resource blocks allocated to the mobile station MS and next parameters are the n values of cluster sizes.

The formulas are similar to the third mode of realization with some slight modifications: $Q=n+2$, $q0=n-1$, $q_k=1$ for any $k=1 \ldots n+1$.

The weighted sum constraint becomes:

$$(n-1)M_0 + \sum_{k=1}^{n+1} M_k \leq N_{RBG} + 1$$

$M_0$ takes values from 1 to $\text{floor}((N_{RBG}-n)/(n-1))$. For any fixed $M_0$ there are $C(N_{RBG}+1-(n-1)M_0, n+1)$ possible combinations.

For any $k>0$, for any fixed $(M_0 \ldots M_{k-1})$, parameter $M_k$ tales values from 1 to $$M_{k,max} = N_{RBG} + 1 - (n-1)M_0 - \sum_{p=1}^{k-1} M_p - (n+1-k)$$

$$= N_{RBG} - n + k - (n-1)M_0 - \sum_{p=1}^{k-1} M_p.$$

For any fixed $(M_0 \ldots M_k)$, there are $$C\left(N_{RBG} + 1 - \sum_{p=1}^{k} M_p - (n-1)M_0, n-k+1\right)$$

possible allocations.

Overall, there are $$RIV'''_{nmax} = \sum_{M_0=1}^{floor\ N_{RBG}-n/(n-1)} CN_{RBG} + 1 - (n-1)M_0, n+1$$

possible resource allocation configurations with n clusters of any size but equally spaced.

For example, the present algorithm will be described when it is executed by the processor 200 of the base station BS.

It has to be noted here that in a variant, instead of being executed by the base station BS, the present algorithm is executed by a core network device not shown in FIG. 1 of the wireless cellular telecommunication device for plural base stations BS.

The present algorithm is executed each time clusters of sub-carriers are allocated to a mobile station MS handled by the base station BS.

At step S1100, the processor 200 allocates groups of resource blocks to the mobile station MS. The allocated groups of resource blocks are allocated for example according to channel conditions and/or according to required quality of service.

At next step S1101, the processor 200 determines the parameters from the allocated groups of resource blocks and sets $M_0$ to the number of groups of resource blocks which separate two clusters of groups of resource blocks which are allocated to the mobile station MS.

For example, the allocated groups of resource blocks and the determined parameters are as disclosed in FIG. 12.

FIG. 12 represents a third example of three clusters of at least one group of resource blocks allocated to a mobile station and parameters according to the present invention.

In the example of FIG. 12, three clusters of at least one group of resource blocks are allocated to one mobile station MS and are not contiguous. Each cluster is separated from another cluster by the same number of groups of resource blocks.

FIG. 12 discloses fourteen groups of resource blocks. The first group of resource blocks which is hachured in FIG. 12, is a dummy one. The groups of resource blocks are ordered and have an index varying from 1 to 13. The groups of resource blocks are the one of the wireless cellular telecommunication network which may be allocated to the mobile station MS.

Five parameters noted $M_0$ to $M_4$ are needed to represent the groups of resource blocks which are allocated to the mobile station MS.

The parameter $M_0$ represents the number of groups of resource blocks which separate two clusters of at least one group of resource blocks which are allocated to the mobile station MS. In the example of FIG. 12, $M_0$ is equal to two.

The subset of at least one group of resource blocks which comprises the groups of resource blocks having the indexes 2 and 3 is associated to the parameter $M_0$.

The subset of at least one group of resource blocks which comprises the groups of resource blocks having the indexes 7 and 8 is associated to the parameter $M_0$.

The parameter $M_1$ represents the number of physically existing groups of resource blocks plus one which are not allocated to the mobile station MS and which have an index inferior to the index of the first group of resource blocks of the first cluster of one or plural contiguous groups of resource blocks allocated to the mobile station MS. In the example of FIG. 12, $M_1$ is equal to one. The subset of at least one group of resource blocks which comprises the dummy group of resource blocks is associated to the parameter $M_1$.

The parameter $M_2$ represents the number of groups of resource blocks which are comprised in the first cluster of one or plural contiguous groups of resource blocks allocated to the mobile station MS. In the example of FIG. 12, $M_2$ is equal to one. The subset of at least one group of resource blocks which comprises the group of resource blocks having the index 1 is associated to the parameter $M_2$.

The parameter $M_3$ represents the number of groups of resource blocks which are comprised in the second cluster of one or plural contiguous groups of resource blocks allocated to the mobile station MS. In the example of FIG. 12, $M_3$ is equal to three. The subset of at least one group of resource blocks which comprises the groups of resource blocks having the indexes 4, 5 and 6 is associated to the parameter $M_3$.

The parameter $M_4$ represents the number of groups of resource blocks which are comprised in the third cluster of one or plural contiguous groups of resource blocks allocated to the mobile station MS. In the example of FIG. 12, $M_4$ is equal to two. The subset of at least one group of resource blocks which comprises the groups of resource blocks having the indexes 9 and 10 is associated to the parameter $M_4$.

At next step S1102, the processor 200 calculates a sum $S_0(M_0)$ according to the following formula:

$$S_0'''(M_0) = \sum_{m_0=1}^{M_0-1} C(N_{RBG} + 1 - (n-1)m_0, n+1). \text{ If } M_0 = 1, S_0 = 0.$$

According to the example of FIG. 10, $S_0'''(M_0)=165$.

The sum $S_0'''(M_0)$ is the number of possible resource allocations with $m_0<M_0$. Here, this is the number of possible resource allocations with clusters of any size spaced by equal inter-clusters gaps containing the same number of groups of resource blocks which is less than $M_0$.

At next step S1103, the processor 200 sets the value of the information RIV''' enabling the mobile station MS to identify which resources of the wireless telecommunication network are allocated to the mobile station MS to the value $S_0'''(M_0)$.

At next step S1104, the processor 200 sets the value of the variable k to one.

At next step S1105, the processor 200 calculates a sum $S_k'''(M_0, \ldots, M_k)$ according to the following formula:

$$S_k'''(M_0 \ldots M_k) = \sum_{m_k=1}^{M_k-1} C\left(N_{RBG} + 1 - \sum_{p=1}^{k-1} M_p - (n-1)M_0 - m_k, n-k+1\right)$$

and $$S_k'''(M_0, \ldots, M_k) = 0 \text{ if } M_k = 1.$$

The sum $S_k(M_0, \ldots, M_k)$ is the total number of possible resource allocations with the k subsets of groups of resource blocks comprising respectively an amount of groups of resource blocks of exactly $M_0, \ldots M_{k-1}$, and with a (k+1)-th subset of groups of resource blocks comprising an amount of resources $m_k$ inferior to the value of the parameter $M_k$.

In other words, for each value of k, with k=1 . . . n+1, the processor 200 calculates, within the set of possible groups of resource blocks allocations, the number of possibilities of having for each subset corresponding to a parameter $M_0$ to $M_{k-1}$ having a lower rank than the parameter $M_k$ an amount of groups of resource blocks that is equal to the corresponding parameter $M_0$ to $M_{k-1}$ and having in the subset corresponding to the parameter $M_k$ an amount of groups of resource blocks that is lower than the parameter $M_k$.

At next step S1106, the processor 200 sets the value of the information RIV''' enabling the mobile station MS to identify which resources of the wireless telecommunication network are allocated to the mobile station MS to the value RIV'''+$S_k'''$ $(M_0, \ldots, M_k)$.

At next step S1106, the processor 200 checks if k is equal to n+1. If k is equal to n+1, the processor 200 moves to step S1109. Otherwise, the processor 200 moves to step S1108, increments the variable k by one and returns to step S1105.

At next step S1109, the processor 200 commands the transfer of the information RIV''' enabling the mobile station MS to identify which resources of the wireless telecommunication network are allocated to the mobile station MS.

According to the above mentioned example:
$S_0'''(M_0)=495$,
$S_1'''(M_0,M_1)=0$,
$S_2'''(M_0,M_1,M_2)=0$,
$S_3'''(M_0,M_1,M_2,M_3)=13$
and $S_4'''(M_0,M_1,M_2,M_3,M_4)=1$.
RIV''' is equal to 509.

It has to be noted here that in a variant, the number of clusters may be decided by the base station BS and is not known by the mobile station MS.

In such case, instead of setting at step S903 the value of the information RIV''' enabling the mobile station MS to identify which resources of the wireless telecommunication network are allocated to the mobile station MS to the value $S_0'''(M_0)$, the processor 200 sets the value of the information RIV''' enabling the mobile station MS to identify which resources of the wireless telecommunication network are allocated to the mobile station MS to the value $$S_0'''(M_0) + \sum_{n'=n_{min}}^{n-1} RIV_{n',max}''' \text{ where}$$

$$RIV_{n',max}''' = \sum_{M_0=1}^{floor\ N_{RBG}-n'/(n'-1)} CN_{RBG} + 1 - (n'-1)M_0, n'+1$$

FIG. 13 discloses a first example of an algorithm executed by a mobile station according to the first mode of realization of the present invention.

In the first mode of realization, the number n of clusters of at least one group of resource blocks is known by the mobile station MS.

More precisely, the present algorithm is executed by the processor 300 of each mobile station MS.

At step S1300, the processor 300 detects the reception through the wireless interface 305 of information $RIV_n$ enabling the determination of which groups of resource blocks are allocated to the mobile station MS.

At next step S1301, the processor 300 finds M'$_0$ such that $S_0(M_0') \leq RIV_n < S_0(M_0'+1)$ using the same formula as the one disclosed at step S702 of FIG. 7.

According to the example of FIG. 6, $S_0(1)=0 \leq 745 < S_0(2)=C(13,5)=1287$.

The processor 300 finds M'$_0$=1.

At next step S1302, the processor 300 decides that $M_0=M'_o=1$.

In other words, the processor 300:
determines a number of possibilities of having a subset of at least one group of resource blocks corresponding to the parameter $M_0$, the subset comprising less than a first amount of resources M'$_0$,
determines a number of possibilities of having a subset of at least one resource corresponding to the parameter $M_0$, the subset comprising less than the amount M'$_0$ plus one of groups of resource blocks,
selects the first amount of groups of resource blocks as a first parameter if the number of possibilities of having a subset of at least one group of resource blocks corresponding to the first parameter, the subset comprising less than the first amount of groups of resource blocks, is lower than or equal to the received information and if the number of possibilities of having a subset corresponding to the first parameter, the subset of at least one group of resource blocks comprising less than the first amount of groups of resource blocks plus one, is upper than the received information.

At next step S1303, the processor 300 sets the information $RIV_n$ enabling the determination of which groups of resource blocks are allocated to the mobile station MS to the value of $RIV_n$ minus $S_0(M_0)$, i.e. to the value 745.

At next step S1304, the processor 300 sets the value of the variable k to one.

At next step S1305, the processor 300 finds $M'_k$ such that $S_k(M_0, \ldots, M_{k-1}, M_k') \leq RIV_n < S_k(M_0, \ldots, M_{k-1}, M_k'+1)$ using the same formula as the one disclosed at step S705 of FIG. 7.

In other words, the processor 300:
determines for the parameter $M_k$, within the set of possible groups of resource blocks allocations:
a first number of possibilities of having for each subset of at least one group of resource blocks corresponding to a parameter $M_0$ to $M_{k-1}$ having a lower rank than the parameter $M_k$, each subset comprising an amount of groups of resource blocks that is equal to the parameter $M_0$ to $M_{k-1}$ the subset corresponds to and having a subset of at least one group of resource blocks corresponding to the parameter $M_k$ comprising an amount of groups of resource blocks that is lower than a given value,
a second number of possibilities of having for each subset of at least one group of resource blocks corresponding to a parameter $M_0$ to $M_{k-1}$ having a lower rank than the parameter $M_k$, each subset comprising an amount of groups of resource blocks that is equal to the parameter $M_0$ to $M_{k-1}$ the subset corresponds to and having a subset of at least one group of resource blocks corresponding to the parameter $M_k$ comprising an amount of groups of resource blocks that is lower than the given value plus one,
selects the given value as the parameter $M_k$ if the first number is lower than or equal to the modified information and if the second number is upper than the modified information,
updates the modified information by subtracting the first number from the modified information.

At next step S1306, the processor 300 sets the information $RIV_n$ enabling the determination of which groups of resource blocks are allocated to the mobile station MS to the value of $RIV_n$ minus $S_k(M_0, \ldots, M_k)$ At next step S1307, the processor 300 checks if k is equal to 2n−1. If k is equal to 2n−1, the processor 200 interrupts the present algorithm as each parameter has been identified. Otherwise, the processor 300 moves to step S1309, increments the variable k by one and returns to steps S1305.

According to the example of FIG. 6:
$S_1(1,2)=495 \leq 745 < S_1(1,3)=825$, the processor 300 determines $M_1$ as being equal to two,
$RIV_n$ becomes equal to 250,
$S_2(1,2,3)=204 \leq 745-495 < S_2(1,2,4)=260$, the processor 300 determines $M_2$ as being equal to three,
$RIV_n$ becomes equal to 46,
$S_3(1,2,3,4)=46=RIV_n<S_3(1,2,3,5)=52$, the processor 300 determines $M_3$ as being equal to four,
$RIV_n$ becomes equal to null value,
As $RIV_n$ becomes equal to null value, the processor 300 determines $M_4$ and $M_5$ as being equal to one. All parameters being determined, the processor 300 interrupts the present algorithm.

FIG. 14 discloses a second example of an algorithm executed by a mobile station according to the second mode of realization of the present invention.

In the second mode of realization, the number n of clusters of at least one group of resource blocks may vary from $n_{min}$ to $n_{max}$, $n_{min}$ being known by the mobile station MS. $n_{min}$ is different from $n_{max}$ and $n_{min}$ is upper than one. $n_{max}$ is equal to or lower than $(N_{RBG}+1)/2)$.

More precisely, the present algorithm is executed by the processor 300 of each mobile station MS.

At step S1400, the processor 300 detects the reception through the wireless interface 305 of information RIV' enabling the determination of which groups of resource blocks are allocated to the mobile station MS.

At next step S1401, the processor 300 finds n such that:

$$\sum_{n'=n_{min}}^{n-1} C(N_{RBG}+1, 2n') \leq RIV' < \sum_{n'=n_{min}}^{n} C(N_{RBG}+1, 2n').$$

According to the example of FIG. 6, $C(14,4)=1001 \leq RIV' < C(14,4)+C(14,6)=4004$.

The processor 300 determines that n is equal to three.

At next step S1403, the processor 300 sets the information RIV' enabling the determination of which groups of resource blocks are allocated to the mobile station MS to the value of RIV' minus $$\sum_{n'=n_{min}}^{n} C(N_{RBG}+1, 2n'),$$

i.e. to the value 745.

At next step S1404, the processor 300 finds $M'_0$ such that $S_0(M_0') \leq RIV_n < S_0(M_0'+1)$ using the same formulas as the one disclosed at steps S702 and S703 of FIG. 7.

According to the example of FIG. 6, $S_0(1)=0 \leq 745 < S_0(2)=C(13,5)=1287$.

The processor 300 finds $M'_0=1$.

At next step S1405, the processor 300 decides that $M_0=M'_0=1$.

In other words, the processor 300:
determines a number of possibilities of having a subset of at least one group of resource blocks corresponding to the parameter $M_0$, the subset comprising less than a first amount of resources $M'_0$,
determines a number of possibilities of having a subset of at least one resource corresponding to the parameter $M_0$, the subset comprising less than the amount $M'_0$ plus one of groups of resource blocks,
selects the first amount of groups of resource blocks as a first parameter if the number of possibilities of having a subset of at least one group of resource blocks corresponding to the first parameter, the subset comprising less than the first amount of groups of resource blocks, is lower than or equal to the received information and if the number of possibilities of having a subset corresponding to the first parameter, the subset of at least one group of resource blocks comprising less than the first amount of groups of resource blocks plus one, is upper than the received information.

At next step S1406, the processor 300 sets the information RIV' enabling the determination of which groups of resource blocks are allocated to the mobile station MS to the value of RIV' minus $S_0(M_0)$, i.e. to the value 745.

At next step S1407, the processor 300 sets the variable k to the value one.

At next step S1408, the processor 300 finds M'$_k$ such that:
S$_k$(M$_0$, ..., M$_{k-1}$,M$_k$')≤RIV'<S$_k$(M$_0$, ..., M$_{k-1}$,M$_k$'+1) using the same formula as the one disclosed at step S806 of FIG. 8.

At next step S1409, the processor 300 decides that M$_k$=M'$_k$.

In other words, the processor 300:

determines for the parameter M$_k$, within the set of possible groups of resource blocks allocations:
  a first number of possibilities of having for each subset of at least one group of resource blocks corresponding to a parameter M$_0$ to M$_{k-1}$ having a lower rank than the parameter M$_k$, each subset comprising an amount of groups of resource blocks that is equal to the parameter M$_0$ to M$_{k-1}$ the subset corresponds to and having a subset of at least one group of resource blocks corresponding to the parameter M$_k$ comprising an amount of groups of resource blocks that is lower than a given value,
  a second number of possibilities of having for each subset of at least one group of resource blocks corresponding to a parameter M$_0$ to M$_{k-1}$ having a lower rank than the parameter M$_k$, each subset comprising an amount of groups of resource blocks that is equal to the parameter M$_0$ to M$_{k-1}$ the subset corresponds to and having a subset of at least one group of resource blocks corresponding to the parameter M$_k$ comprising an amount of groups of resource blocks that is lower than the given value plus one,
  selects the given value as the parameter M$_k$ if the first number is lower than or equal to the modified information and if the second number is upper than the modified information,
  updates the modified information by subtracting the first number from the modified information.

At next step S1410, the processor 300 sets the information RIV' enabling the determination of which groups of resource blocks are allocated to the mobile station MS to the value of RIV' minus S$_k$(M$_0$, ..., M$_k$)

At next step S1411, the processor 300 checks if k is equal to 2n−1. If k is equal to 2n−1, the processor 200 interrupts the present algorithm as each parameter has been identified. Otherwise, the processor 300 moves to step S1412, increments the variable k by one and returns to steps S1408.

According to the example of FIG. 6:
S$_1$(1,2)=495≤745<S$_1$(1,3)=825, the processor 300 determines M$_1$ as being equal to two,
RIV' becomes equal to 250,
S$_2$(1,2,3)=204≤745−495<S$_2$(1,2,4)=260, the processor 300 determines M$_2$ as being equal to three,
RIV' becomes equal to 46,
S$_3$(1,2,3,4)=46=RIV$_n$<S$_3$(1,2,3,5)=52, the processor 300 determines M$_3$ as being equal to four,
RIV' becomes equal to null value,
As RIV' becomes equal to null value, the processor 300 determines M$_4$ and M$_5$ as being equal to one.

Since all the parameters have been determined, the processor 300 identifies among the set of resources that can be allocated in the wireless telecommunication network to the mobile station, which resources of the wireless telecommunication network are allocated to the mobile station according to the determined parameters.

FIG. 15 discloses a third example of an algorithm executed by a mobile station according to the third mode of realization of the present invention.

In the third mode of realization, the allocated clusters have the same number of groups of resource blocks.

More precisely, the present algorithm is executed by the processor 300 of each mobile station MS.

At step S1500, the processor 300 detects the reception through the wireless interface 305 of information RIV" enabling the determination of which groups of resource blocks are allocated to the mobile station MS.

At next step S1501, the processor 300 finds M'$_0$ such that S"$_0$(M$_0$')≤RIV$_n$"<S"$_0$(M$_0$+1) using the same formula as the one disclosed at step S902 of FIG. 9.

According to the example of FIG. 10, S"$_0$(2)=165≤196<S"$_0$(3)=285.

The processor 300 finds M'$_0$=2.

At next step S1502, the processor 300 decides that M$_0$=M'$_0$=2.

At next step S1503, the processor 300 sets the information RIV" enabling the determination of which groups of resource blocks are allocated to the mobile station MS to the value of RIV" minus S"$_0$(M$_0$), i.e. to the value 31.

At next step S1504, the processor 300 sets the variable k to the value one.

At next step S1505, the processor 300 finds M'$_k$ such that S"$_k$(M$_0$,...,M$_{k-1}$,M$_k$')≤RIV$_n$"<S"$_k$(M$_0$,...,M$_{k-1}$,M$_k$'+1) using the same formula as the one disclosed at step S905 of FIG. 9.

At next step S1506, the processor 300 decides that M$_k$=M'$_k$.

At next step S1507, the processor 300 sets the information RIV" enabling the determination of which groups of resource blocks are allocated to the mobile station MS to the value of RIV" minus S"$_k$(M$_0$, ..., M$_k$).

At next step S1508, the processor 300 checks if k is equal to n. If k is equal to n, the processor 200 interrupts the present algorithm as each parameter has been identified. Otherwise, the processor 300 moves to step S1509, increments the variable k by one and returns to steps S1305.

According to the example of FIG. 10:
S"$_1$(2,2)=21≤31<S"$_1$(2,3)=36, the processor 300 determines M$_1$ as being equal to two,
RIV" becomes equal to 10,
S"$_2$(2,2,3)=9≤10<S"$_2$(2,2,4)=12, the processor 300 determines M$_2$ as being equal to three,
RIV" becomes equal to 1,
S"$_3$(2,2,3,2)=1=RIV", the processor 300 determines M$_3$ as being equal to two,
RIV" becomes equal to null value.

Since all the parameters have been determined, the processor 300 identifies among the set of resources that can be allocated in the wireless telecommunication network to the mobile station, which resources of the wireless telecommunication network are allocated to the mobile station according to the determined parameters.

It has to be noted here that in a variant, the number of clusters may be decided by the base station BS and is not known by the mobile station MS.

In such case, the processor 300 executes similar steps as the steps S1401 and S1403 of FIG. 14 prior to executing the step S1501 using the following formulas:

find n such that:

$$\sum_{n'=n_{min}}^{n-1} RIV''_{n',max} \leq RIV'' < \sum_{n'=n_{min}}^{n} RIV''_{n',max} - RIV'' =$$

$$RIV'' - \sum_{n'=n_{min}}^{n-1} RIV''_{n',max},$$

where

-continued $$RIV''_{n',max} = \sum_{M_0=1}^{floor\ NRBG+1-n'/n'} CN_{RBG} + 1 - n'M_0, n'.$$

FIG. 16 discloses a fourth example of an algorithm executed by a mobile station according to the fourth mode of realization of the present invention.

In the fourth mode of realization, the allocated clusters are spaced by the same number of groups of resource blocks.

More precisely, the present algorithm is executed by the processor 300 of each mobile station MS.

At step S1600, the processor 300 detects the reception through the wireless interface 305 of information RIV''' enabling the determination of which groups of resource blocks are allocated to the mobile station MS.

At next step S1601, the processor 300 finds $M'_0$ such that $S'''_0(M_0) \leq RIV''' < S'''_0(M_0'+1)$ using the same formula as the one disclosed at step S1102 of FIG. 11.

According to the example of FIG. 12, $S'''_0(2)=495 \leq 509 < S'''_0(3)=825$.

The processor 300 finds $M'_0=2$.

At next step S1602, the processor 300 decides that $M_0=M'_0=2$.

At next step S1603, the processor 300 sets the information RIV''' enabling the determination of which groups of resource blocks are allocated to the mobile station MS to the value of RIVn''' minus $S'''_0(M_0)$, i.e. to the value 14.

At next step S1604, the processor 300 sets the variable k to the value one.

At next step S1605, the processor 300 finds $M'_k$ such that $S'''_k(M_0, \ldots, M_{k-1}, M_k') \leq RIV''' < S'''_k(M_0, \ldots, M_{k-1}, M_k'++1)$ using the same formula as the one disclosed at step S1105 of FIG. 11.

At next step S1606, the processor 300 decides that $M_k=M'_k$.

At next step S1607, the processor 300 sets the information RIV''' enabling the determination of which groups of resource blocks are allocated to the mobile station MS to the value of RIVn''' minus $S'''_k(M_0, \ldots, M_k)$ At next step S1608, the processor 300 checks if k is equal to n+1. If k is equal to n+1, the processor 200 interrupts the present algorithm as each parameter has been identified. Otherwise, the processor 300 moves to step S1609, increments the variable k by one and returns to steps S1605.

According to the example of FIG. 12:

$S'''_1(2,1)=0 \leq 14 < S_1(2,2)=84$, the processor 300 determines $M_1$ as being equal to one, RIV''' becomes equal to 14, $S'''_2(2,1,1)=0 \leq 14 < S'''_2(2,1,2)=28$, the processor 300 determines $M_2$ as being equal to one, RIV''' becomes equal to 14, $S'''_3(2,1,1,3)=13 \leq 14 < S'''_3(2,1,1,4)=18$, RIV''', the processor 300 determines $M_3$ as being equal to three, RIV''' becomes equal to one.

$S'''_4(2,1,1,3,2)=RIV'''$, the processor 300 determines $M_4$ as being equal to two.

Since all the parameters have been determined, the processor 300 identifies among the set of resources that can be allocated in the wireless telecommunication network to the mobile station, which resources of the wireless telecommunication network are allocated to the mobile station according to the determined parameters.

It has to be noted here that in a variant, the number of clusters may be decided by the base station BS and is not known by the mobile station MS.

In such case, the processor 300 executes similar steps as the steps S1401 and S1403 of FIG. 14 prior to executing the step S1601 using the following formulas:

find n such that:

$$\sum_{n'=n_{min}}^{n-1} RIV'''_{n',max} \leq RIV''' < \sum_{n'=n_{min}}^{n} RIV'''_{n',max} - RIV''' =$$

$$RIV''' - \sum_{n'=n_{min}}^{n-1} RIV'''_{n',max},$$

where $$RIV'''_{n',max} = \sum_{M_0=1}^{floor\ N_{RBG}-n'/(n'-1)} CN_{RBG} + 1 - (n'-1)M_0, n' + 1.$$

Naturally, many modifications can be made to the embodiments of the invention described above without departing from the scope of the present invention.

The invention claimed is:

1. A method for determining information which enable a mobile station to identify among a set of resources that can be allocated in a wireless telecommunication network to the mobile station, said resources being subcarriers or resource blocks in the frequency domain, which resources of the wireless telecommunication network are allocated to the mobile station, the allocated resources being divided into plural non contiguous clusters of one resource or of plural contiguous resources, wherein the method is executed by a base station and comprises:

allocating resources to the mobile station, the allocated resources dividing the set of resources into subsets of resources;

determining, based upon the allocated resources, plural ordered parameters, each parameter representing a number of contiguous resources in a subset of at least one resource corresponding to the parameter, the at least one resource being not allocated to the mobile station or forming a cluster of one resource or of plural contiguous resources allocated to the mobile station;

calculating, for the first parameter of the plural ordered parameters, within a set of possible resource allocations,
a number of possible combinations of resource allocation having, in a subset corresponding to the first parameter,
an amount of resources that is less than the first parameter;

calculating, for each following parameter of the plural ordered parameters, within a set of possible resource allocations,
a number of possible combinations of resource allocation having, for each subset corresponding to a parameter
having a rank which is lower than said following parameter,
an amount of resources that is equal to the parameter having a lower rank which corresponds to the subset respectively and
having, in the subset corresponding to said following parameter,
an amount of resources that is less than said following parameter; and determining information which enable a mobile station to identify which resources of the wireless telecommunication network are allocated to the mobile station, the information depending on a sum of all the calculated numbers, depending on a number of resources that can be allocated in the wireless telecommunication network to the mobile station, and depending on a number of clusters.

2. The method according to claim 1, wherein at least two noncontiguous clusters of one resource or of plural contiguous resources are allocated to the mobile station, each cluster of one resource or of plural contiguous resources comprising a number of resources which is independent of a number of resources comprised in other allocated cluster or clusters of one resource or of plural contiguous resources, and a number of resources separating two clusters of one resource or of plural contiguous resources is independent of any other resources that may either separate two clusters of one resource or of plural contiguous resources, or be comprised in other allocated clusters of one resource or of plural contiguous resources.

3. The method according to claim 1, wherein at least three noncontiguous clusters of one resource or of plural contiguous resources are allocated to the mobile station, each cluster of one resource or of plural contiguous resources comprising a same number of resources which is independent of any other resources that may separate two clusters.

4. The method according to claim 3, wherein the first parameter is the number of resources comprised in each cluster of one resource or of plural contiguous resources.

5. The method according to claim 1, wherein at least three noncontiguous clusters of one resource or of plural contiguous resources are allocated to the mobile station, each cluster of one resource or of plural contiguous resources comprising a number of resources which is independent of a number of resources comprised in other allocated clusters of one resource or of plural contiguous resources and numbers of resources separating two clusters are identical.

6. The method according to claim 5, wherein the first parameter is the number of resources separating two clusters of one resource or of plural contiguous resources.

7. The method according to claim 1, wherein the number of clusters of one resource or of plural contiguous resources is predetermined.

8. The method according to claim 1, wherein the method further comprises:
computing a number of all possible resource allocations with at least a predetermined number of clusters and less than the current number of clusters; and
modifying the information which enables the mobile station to identify which resources of the wireless telecommunication network are allocated to the mobile station by adding the number of all possible resource allocations with the at least the predetermined number of clusters less than the current number of clusters to the information.

9. A method for identifying among a set of resources that can be allocated in a wireless telecommunication network to a mobile station, which resources of the wireless telecommunication network are allocated to the mobile station, the allocated resources being divided into plural non contiguous clusters of one resource or of plural contiguous resources, wherein the method comprises executed by the mobile station:
receiving information which enable the mobile station to identify which resources of the wireless telecommunication network are allocated to the mobile station, said resources being subcarriers or resource blocks in the frequency domain, the information depending on a number of resources that can be allocated in the wireless telecommunication network to the mobile station and on a number of clusters;
determining a number of possible combinations of resource allocation
having
a subset of at least one resource corresponding to a first parameter, the subset comprising an amount of resources that is less than a first amount of resources;
determining a number of possible combinations of resource allocation
having
a subset of at least one resource corresponding to the first parameter, the subset comprising an amount of resources that is less than the first amount of resources plus one;
selecting the first amount of resources as a first parameter if the number of possible combinations of resource allocation
having
a subset of at least one resource corresponding to the first parameter, the subset comprising an amount of resources that is less than the first amount of resources,
is lower than or equal to the received information
and
if the number of possible combinations of resources allocation
having
a subset corresponding to the first parameter, the subset of at least one resource comprising an amount of resources that is less than the first amount of resources plus one,
is greater than the received information;
modifying the information which enables the mobile station to identify which resources of the wireless telecommunication network are allocated to the mobile station by subtracting
the number of possible combinations of resource allocation
having
a subset of at least one resource corresponding to the first parameter, the subset comprising an amount of resources that is less than the first parameter,
from the information which enables the mobile station to identify which resources of the wireless telecommunication network are allocated to the mobile station;
and as far as all the parameters are not determined,
determining for the following parameter, within a set of possible resource allocations:
a first number of possible combinations of resource allocation
having, for each subset of at least one resource corresponding to a parameter having a rank which is lower than said following parameter,
each subset comprising an amount of resources that is equal to the parameter which corresponds to the subset respectively
and
having
a subset of at least one resource corresponding to said following parameter comprising an amount of resources that is less than a given value, a second number of possible combinations of resource allocation having, for each subset of at least one resource corresponding to a parameter having a rank which is lower than said following parameter, each subset comprising an amount of resources that is equal to the parameter which corresponds to the subset respectively and having a subset of at least one resource corresponding to said following parameter comprising an amount of resources that is less than a given value plus one;

selecting the given value as the following parameter if the first number of possible combinations of resource allocation is lower than or equal to the modified information and if the second number of possible combinations of resource allocation is greater than the modified information;

updating the modified information by subtracting the first number of possible combinations of resource allocation from the modified information; and identifying among the set of resources that can be allocated in the wireless telecommunication network to the mobile station, which resources of the wireless telecommunication network are allocated to the mobile station according to the parameters when all the parameters are determined.

10. The method according to claim 9, wherein the number of allocated clusters is determined by the mobile station by:

determining a number of resource allocations with at least a minimum predetermined number of clusters and less than a given number of clusters;

determining a number of resource allocations with at least the minimum predetermined number of clusters and less than the given number plus one of clusters;

selecting the given number as the number of clusters if the number of resource allocations with at least the predetermined minimum number of clusters and less than the given number of clusters is lower than or equal to the received information and if the number of resource allocations with at least the minimum predetermined number of clusters and less than the given number plus one of clusters is greater than the received information;

modifying the received information by subtracting the value of number of resource allocations with at least the predetermined minimum number of clusters and less than the given number of clusters from the received information.

11. A device for determining information which enable a mobile station to identify among a set of resources that can be allocated in a wireless telecommunication network to the mobile station, said resources being subcarriers or resource blocks in the frequency domain, which resources of the wireless telecommunication network are allocated to the mobile station, the allocated resources being divided into plural non contiguous clusters of one resource or of plural contiguous resources, wherein the device for determining information is included in a base station and comprises:

means having a programmed processor that allocates resources to the mobile station, the allocated resources dividing the set of resources into subsets of resources;

means having a programmed processor that determines, based upon the allocated resources, plural ordered parameters, each parameter representing a number of contiguous resources in a subset of at least one resource corresponding to the parameter, the at least one resource being not allocated to the mobile station or forming a cluster of one resource or of plural contiguous resources allocated to the mobile station;

means having a programmed processor that calculates, for the first parameter of the plural ordered parameters, within a set of possible resource allocations, a number of possible combinations of resource allocation having, in a subset corresponding to the first parameter, an amount of resources that is less than the first parameter;

means having a programmed processor that calculates, for each following parameter of the plural ordered parameters, within a set of possible resource allocations, a number of possible combinations of resource allocation having, for each subset corresponding to a parameter having a rank which is lower than said following parameter, an amount of resources that is equal to the parameter having a lower rank which corresponds to the subset respectively and having, in the subset corresponding to said following parameter, an amount of resources that is less than said following parameter; and means having a programmed processor that determines information which enable a mobile station to identify which resources of the wireless telecommunication network are allocated to the mobile station, the information depending on a sum of all the calculated numbers, the information depending on a number of resources that can be allocated in a wireless telecommunication network to the mobile station, and depending on a number of clusters.

12. A device for identifying among a set of resources that can be allocated in a wireless telecommunication network to a mobile station, which resources of the wireless telecommunication network are allocated to the mobile station, the allocated resources being divided into plural non contiguous clusters of one resource or of plural contiguous resources, wherein the device for identifying is included in the mobile station and comprises:

means having a programmed processor and a wireless interface that receives information which enable the mobile station to identify which resources of the wireless telecommunication network are allocated to the mobile station, said resources being subcarriers or resource blocks in the frequency domain, the information depending on a number of resources that can be allocated in the wireless telecommunication network to the mobile station and on a number of clusters;

means having a programmed processor that determines a number of possible combinations of resource allocation having
    a subset of at least one resource corresponding to a first parameter, the subset comprising an amount of resources that is less than a first amount of resources;

means having a programmed processor that determines a number of possible combinations of resource allocation having
    a subset of at least one resource corresponding to the first parameter, the subset comprising an amount of resources that is less than the first amount of resources plus one;

means having a programmed processor that selects the first amount of resources as a first parameter
    if the number of possible combinations of resource allocation
        having
            a subset of at least one resource corresponding to the first parameter, the subset comprising an amount of resources that is less than the first amount of resources,
is lower than or equal to the received information
and
if the number of possible combinations of resource allocation
    having
        a subset corresponding to the first parameter, the subset of at least one resource comprising an amount of resources that is less than the first amount of resources plus one,
    is greater than the received information;

means having a programmed processor that modifies the information which enables the mobile station to identify which resources of the wireless telecommunication network are allocated to the mobile station
    by subtracting
        the number of possible combinations of resource allocation
            having
                a subset of at least one resource corresponding to the first parameter, the corresponding subset comprising an amount of resources that is less than the first parameter,
from the information which enables the mobile station to identify which resources of the wireless telecommunication network are allocated to the mobile station;

means having a programmed processor that determines for the following parameter, within a set of possible resource allocations and as far as all the parameters are not determined:
    a first number of possible combinations of resource allocation
        having, for each subset of at least one resource corresponding to a parameter having a rank which is lower than said following parameter,
            each subset comprising an amount of resources that is equal to the parameter which corresponds to the each subset respectively
    and
    having
        a subset of at least one resource corresponding to said following parameter comprising an amount of resources that is less than a given value,
    a second number of possible combinations of resource allocation
        having, for each subset of at least one resource corresponding to a parameter having rank which is a lower than said following parameter,
            each subset comprising an amount of resources that is equal to the parameter which corresponds to the subset respectively
    and
    having
        a subset of at least one resource corresponding to said following parameter comprising an amount of resources that is less than a given value plus one; and means having a programmed processor that selects for said following parameter the given value as the following parameter
    if the first number of possible combinations of resource allocation is lower than or equal to the modified information
    and
    if the second number of possible combinations of resource allocation is greater than the modified information,
as far as all the parameters are not determined;

means having a programmed processor that updates the modified information
    by subtracting
        the first number of possible combinations of resource allocation
    from the modified information
as far as all the parameters are not determined; and means having a programmed processor that identifies among the set of resources that can be allocated in the wireless telecommunication network to the mobile station, which resources of the wireless telecommunication network are allocated to the mobile station according to the parameters when all the parameters are determined.

13. A non-transitory computer-readable recording medium storing a program which can be directly loadable into a programmable device, the program comprising instructions or portions of code for implementing the steps of the method according to claim 1, when said computer program is executed on a programmable device.

14. A non-transitory computer-readable recording medium storing a program which can be directly loadable into a programmable device, the program comprising instructions or portions of code for implementing the steps of the method according to claim 9, when said computer program is executed on a programmable device.

\* \* \* \* \*